(12) United States Patent
Takizawa et al.

(10) Patent No.: US 12,537,598 B2
(45) Date of Patent: Jan. 27, 2026

(54) RELAY SYSTEM, COMMUNICATION DEVICE, AND DELAY PERIOD DETERMINATION METHOD

(71) Applicant: Sumitomo Electric Industries, Ltd., Osaka (JP)

(72) Inventors: Yasuhiro Takizawa, Osaka (JP); Takaaki Taguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 290 days.

(21) Appl. No.: 18/567,794

(22) PCT Filed: Mar. 10, 2022

(86) PCT No.: PCT/JP2022/010656
§ 371 (c)(1),
(2) Date: Dec. 7, 2023

(87) PCT Pub. No.: WO2022/259666
PCT Pub. Date: Dec. 15, 2022

(65) Prior Publication Data
US 2024/0267119 A1    Aug. 8, 2024

(30) Foreign Application Priority Data

Jun. 11, 2021    (JP) ................. 2021-097774

(51) Int. Cl.
*H04B 10/2575*    (2013.01)
*H04B 10/079*    (2013.01)

(52) U.S. Cl.
CPC ........... *H04B 10/0795* (2013.01); *H04B 10/25752* (2013.01)

(58) Field of Classification Search
CPC .................................. H04B 10/2575–25759
See application file for complete search history.

(56) References Cited

U.S. PATENT DOCUMENTS

| | | |
|---|---|---|
| 9,525,482 B1 | 12/2016 | Tse |
| 2012/0086814 A1 | 4/2012 | Tsubaki et al. |
| | (Continued) | |

FOREIGN PATENT DOCUMENTS

| | | |
|---|---|---|
| EP | 2833667 A2 | 2/2015 |
| JP | 2011-234341 A | 11/2011 |
| JP | 2015-046869 A | 3/2015 |

*Primary Examiner* — Nathan M Cors
(74) *Attorney, Agent, or Firm* — XSENSUS LLP

(57) ABSTRACT

A relay system includes a first and a second communication device at least one of which includes an estimating unit that acquires, based on a dispersion compensation amount acquired by an optical transceiver, an estimated value of a transmission delay period, the transmission delay period being a period during which an optical signal is transmitted through an optical fiber; a specifying unit configured to specify, based on the estimated value of the transmission delay period acquired by the estimating unit, a transmission-related time which is related to transmission of a control code by the first communication device or the second communication device, or a reception-related time which is related to reception of the control code by the second communication device or the first communication device; and a determining unit configured to determine, based on the transmission-related time and the reception-related time, the transmission delay period in downlink or uplink channel.

20 Claims, 17 Drawing Sheets

(56) References Cited

U.S. PATENT DOCUMENTS

| | | | |
|---|---|---|---|
| 2013/0202291 A1* | 8/2013 | Cavaliere | H04L 43/0864 |
| | | | 398/33 |
| 2013/0322872 A1* | 12/2013 | Jobert | H04B 10/07 |
| | | | 398/25 |
| 2014/0282805 A1* | 9/2014 | Bowler | H04B 10/25751 |
| | | | 725/129 |
| 2015/0341138 A1* | 11/2015 | Ishihara | H04J 3/14 |
| | | | 398/35 |

* cited by examiner

RELAY SYSTEM, COMMUNICATION DEVICE, AND DELAY PERIOD DETERMINATION METHOD

CROSS-REFERENCE TO RELATED APPLICATION

This application is based on PCT filing PCT/JP2022/010656, filed Mar. 10, 2022, which claims priority from Japanese Patent Application No. 2021-097774, filed Jun. 11, 2021, the entire contents of each are incorporated herein by reference.

TECHNICAL FIELD

The present disclosure relates to a relay system, a communication device, and a delay period determination method.

BACKGROUND ART

An optical communication system may be used in a mobile front-haul (MFH), a mobile mid-haul (MMH), and a mobile back-haul (MBH) included in a mobile communication network. In an optical transport network (OTN) relay system, a client signal received by an optical transmission device is converted into an OTN signal, and the OTN signal is transmitted between optical transmission devices connected through an optical fiber cable. The optical transmission device that has received the OTN signal restores the client signal from the OTN signal and transmits the client signal from a client port.

In the OTN network, asymmetric delay occurs in which a transmission delay period in an uplink channel through which a signal is transmitted from a lower-side device such as a remote radio head (RRH) to a higher-side device such as a base band unit (BBU) is different from a transmission delay period in a downlink channel through which a signal is transmitted from the higher-side device to the lower-side device. Since the asymmetric delay reduces the accuracy of time synchronization in the network, it is desirable to correct the asymmetric delay.

PTL 1 discloses a method for measuring asymmetric delay in an OTN network. In the method disclosed in PTL 1, a time stamp is issued when the control code (K28.5) at the head of the CPRI (Common Public Radio Interface) hyperframe passes through the entrance of the client channel and when it passes through the exit. Change patterns of current running disparities (CRD) of control codes at an entrance and an exit of a client channel are compared, time stamps when the same control code passes through the entrance and the exit are specified, and a transmission delay period in a downlink channel is determined from a difference between the two specified time stamps. The transmission delay period in the uplink channel is also obtained by the same procedure.

CITATION LIST

Patent Literature

PTL 1: U.S. Pat. No. 9,525,482

SUMMARY OF INVENTION

A relay system according to an aspect of the present disclosure is a relay system configured to relay communication between a first device and a second device. The relay system includes a first communication device configured to receive an original signal from the first device; a second communication device configured to transmit the original signal to the second device; and an optical fiber connecting the first communication device and the second communication device. The first communication device and the second communication device are configured to transmit and receive an optical signal through the optical fiber, the optical signal including the original signal and information added to the original signal, the information being communicated between the first communication device and the second communication device. The original signal includes a plurality of control codes communicated in time order, the first communication device and the second communication device are time-synchronized, the first communication device includes a first optical transceiver connected to the optical fiber, the second communication device includes a second optical transceiver connected to the optical fiber, and the first communication device or the second communication device includes an estimating unit configured to acquire, based on a dispersion compensation amount acquired by the first optical transceiver or the second optical transceiver, an estimated value of a transmission delay period, the transmission delay period being a period during which the optical signal is transmitted through the optical fiber; a specifying unit configured to specify, based on the estimated value of the transmission delay period acquired by the estimating unit, a reception-related time when a transmission-related time is known, or the transmission-related time when the reception-related time is known, the transmission-related time being related to transmission of a control code by the first communication device or the second communication device, the reception-related time being related to reception of the control code by the second communication device or the first communication device; and a determining unit configured to determine, based on the transmission-related time and the reception-related time, the transmission delay period in a downlink channel from the first communication device toward the second communication device or an uplink channel from the second communication device toward the first communication device.

A communication device according to an aspect of the present disclosure is a communication device configured to receive, from a first device, an original signal including a plurality of control codes communicated in time order, transmit, to an opposing device connected through an optical fiber, an optical signal including the original signal and information added to the original signal, the information being directed to the opposing device, receive, from the opposing device, an optical signal including the original signal and information added to the original signal, the information being from the opposing device, and transmit, to the first device, the original signal based on the received optical signal. The communication device includes a first optical transceiver connected to the optical fiber; an estimating unit configured to acquire, based on a dispersion compensation amount acquired by the first optical transceiver or a second optical transceiver included in the opposing device and connected to the optical fiber, an estimated value of a transmission delay period, the transmission delay period being a period during which the optical signal is transmitted through the optical fiber; a specifying unit configured to specify, based on the estimated value of the transmission delay period acquired by the estimating unit, a reception-related time when a transmission-related time is known, or the transmission-related time when the reception-related time is known, the transmission-related time being related to transmission of a control code by the communication device or the opposing device, the reception-related time being related to reception of the control code by the opposing device or the communication device; and a determining unit configured to determine, based on the transmission-related time and the reception-related time, the transmission delay period in a first transmission direction from the communication device toward the opposing device or a second transmission direction from the opposing device toward the communication device.

A delay period determination method according to an aspect of the present disclosure is a delay period determination method for determining, by a communication device, a delay period in a relay system in which the communication device and an opposing device are connected to each other through an optical fiber. The delay period determination method includes acquiring, based on a dispersion compensation amount acquired by a first optical transceiver included in the communication device and connected to the optical fiber or a second optical transceiver included in the opposing device and connected to the optical fiber, an estimated value of a transmission delay period, the transmission delay period being a period during which the optical signal is transmitted through the optical fiber; specifying, based on the estimated value of the transmission delay period acquired by the estimating unit, a reception-related time when a transmission-related time is known, or the transmission-related time when the reception-related time is known, the transmission-related time being related to transmission of a control code by the communication device or the opposing device, the reception-related time being related to reception of the control code by the opposing device or the communication device; and determining, based on the transmission-related time and the reception-related time, the transmission delay period in a first transmission direction from the communication device toward the opposing device or a second transmission direction from the opposing device toward the communication device.

The present disclosure can be achieved not only as a communication apparatus having the characteristic configuration as described above but also as a communication method including characteristic processing in the communication apparatus as steps or as a computer program for enabling a computer to execute the steps. Furthermore, a part or all of the communication device can be achieved as a semiconductor integrated circuit, or can be achieved as a relay system including the communication device.

DETAILED DESCRIPTION

Figure 1:
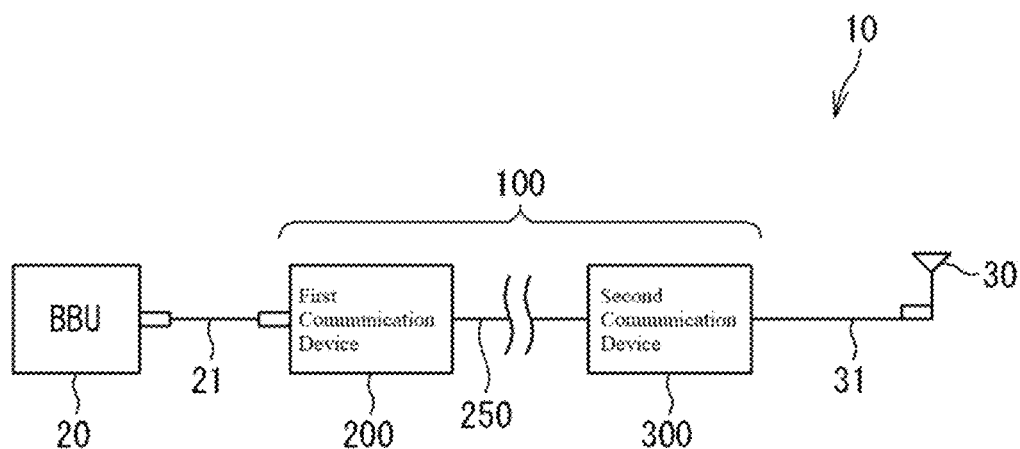
FIG. 1 is a schematic diagram showing an example of a configuration of a communication system according to a first embodiment.

Problem to be Solved by Present Disclosure

The control code and running disparity of K28.5 are used in 8b/10b, and 8b/10b is used in CPRI. However, since eCPRI (enhanced CPRI) used in 5G (fifth generation mobile communication system) does not use 8b/10b, the method disclosed in PTL 1 cannot be applied to a relay system corresponding to 5G.

Advantageous Effects of Present Disclosure

According to the present disclosure, an accurate delay period in a relay system corresponding to 5G can be measured.

DESCRIPTION OF EMBODIMENTS OF PRESENT DISCLOSURE

The following lists and describes an overview of embodiments of the present disclosure.

(1) A relay system according to the present disclosure is a relay system configured to relay communication between a first device and a second device. The relay system includes a first communication device configured to receive an original signal from the first device; a second communication device configured to transmit the original signal to the second device; and an optical fiber connecting the first communication device and the second communication device. The first communication device and the second communication device are configured to transmit and receive an optical signal through the optical fiber, the optical signal including the original signal and information added to the original signal, the information being communicated between the first communication device and the second communication device. The original signal includes a plurality of control codes communicated in time order, the first communication device and the second communication device are time-synchronized, the first communication device includes a first optical transceiver connected to the optical fiber, the second communication device includes a second optical transceiver connected to the optical fiber, and the first communication device or the second communication device includes an estimating unit configured to acquire, based on a dispersion compensation amount acquired by the first optical transceiver or the second optical transceiver, an estimated value of a transmission delay period, the transmission delay period being a period during which the optical signal is transmitted through the optical fiber; a specifying unit configured to specify, based on the estimated value of the transmission delay period acquired by the estimating unit, a reception-related time when a transmission-related time is known, or the transmission-related time when the reception-related time is known, the transmission-related time being related to transmission of a control code by the first communication device or the second communication device, the reception-related time being related to reception of the control code by the second communication device or the first communication device; and a determining unit configured to determine, based on the transmission-related time and the reception-related time, the transmission delay period in a downlink channel from the first communication device toward the second communication device or an uplink channel from the second communication device toward the first communication device. Accordingly, based on the estimated value of the transmission delay period, it is possible to specify the transmission-related time related to the time at which the first communication device or the second communication device transmits one control code among the plurality of control codes transmitted in time series or the reception-related time related to the time at which the second communication device or the first communication device receives the control code. Therefore, the transmission delay period in the downlink channel or the uplink channel can be accurately determined.

(2) The transmission-related time may be a time related to transmission of the control code by the first communication device, the reception-related time may be a time related to reception of the control code by the second communication device, and the determining unit may be configured to determine, based on the transmission-related time and the reception-related time, the transmission delay period in the downlink channel. Accordingly, it is possible to accurately determine the transmission delay period in the downlink channel.

(3) The transmission-related time may be a time related to transmission of the control code by the second communication device, the reception-related time may be a time related to reception of the control code by the first communication device, and the determining unit may be configured to determine, based on the transmission-related time and the reception-related time, the transmission delay period in the uplink channel. Accordingly, it is possible to accurately determine the transmission delay period in the uplink channel.

(4) The first communication device may include a calculating unit configured to calculate a relay delay period by adding a delay period in the first communication device, a delay period in the second communication device, and the transmission delay period determined by the determining unit, the relay delay period being a signal transmission period between a communication port connected to the first device in the first communication device and a communication port connected to the second device in the second communication device. Accordingly, it is possible to accurately calculate the relay delay period in the relay system.

(5) The first communication device may include a reception queue configured to store a block, the block being obtained by dividing the original signal; a framer configured to generate, from the block read from the reception queue, a transmission frame to be transmitted to the second communication device; a first time acquiring unit configured to acquire a first reception time at which the block including the control code is written into the reception queue and a first transmission time at which the block including the control code and read from the reception queue is output to the framer; and a measuring unit configured to measure the delay period in the first communication device by calculating a difference between the first transmission time and the first reception time acquired by the first time acquiring unit. The second communication device may include a deframer configured to restore the block from the transmission frame received by the second optical transceiver; a transmission queue configured to store the block restored by the deframer; and a second time acquiring unit configured to acquire a second reception time at which the block including the control code and restored from the transmission frame including the control code is output from the deframer and a second transmission time at which the block including the control code is read from the transmission queue. The first communication device may include an acquiring unit configured to acquire the delay period in the second communication device, the delay period being obtained by calculating a difference between the second reception time and the second transmission time acquired by the second time acquiring unit. Accordingly, it is possible to accurately measure the delay period in the first communication device and the delay period in the second communication device in the downlink channel.

(6) The second communication device may include a reception queue configured to store a block, the block being obtained by dividing the original signal; a framer configured to generate, from the block read from the reception queue, a transmission frame to be transmitted to the first communication device; and a first time acquiring unit configured to acquire a first reception time at which the block including the control code is written into the reception queue and a first transmission time at which the block including the control code and read from the reception queue is output to the framer. The first communication device may include a deframer configured to restore the block from the transmission frame received by the first optical transceiver; a transmission queue configured to store the block restored by the deframer; a second time acquiring unit configured to acquire a second reception time at which a block including the control code and restored from the transmission frame including the control code is output from the deframer and the second transmission time at which the block including the control code is read from the transmission queue; a measuring unit configured to measure the delay period in the first communication device by calculating a difference between the second reception time and the second transmission time acquired by the second time acquiring unit; and an acquiring unit configured to acquire the delay period in the second communication device, the delay period being obtained by calculating a difference between the first transmission time and the first reception time acquired by the first time acquiring unit. Accordingly, it is possible to accurately measure the delay period in the first communication device and the delay period in the second communication device in the uplink channel.

(7) The determining unit may be configured to determine the transmission delay period in the downlink channel and the transmission delay period in the uplink channel, the calculating unit may be configured to calculate the relay delay period in the downlink channel by adding the delay period in the first communication device, the delay period in the second communication device, and the transmission delay period in the downlink channel, and calculate the relay delay period in the uplink channel by adding the delay period in the first communication device, the delay period in the second communication device, and the transmission delay period in the uplink channel, and the first communication device may further include a control unit configured to control, based on the relay delay period in the downlink channel and the relay delay period in the uplink channel calculated by the calculating unit, a timing to read the block from the reception queue or the transmission queue. Accordingly, it is possible to correct the asymmetry of the delay in the communication.

(8) The first communication device may include a plurality of first communication ports connected to the first device, the second communication device may include a plurality of second communication ports connected to the second device, and the calculating unit may be configured to calculate the relay delay period for each of combinations of one of the plurality of first communication ports and one of the plurality of second communication ports. Accordingly it is possible to individually measure the delay period between the communication ports of the first communication device and the second communication device.

(9) The first communication device or the second communication device may be configured to determine, based on a change in the dispersion compensation amount acquired by the first optical transceiver or the second optical transceiver, whether or not to update the transmission delay period in the downlink channel. Accordingly, when it can be determined that the transmission delay period of the optical fiber has changed, the delay period in the downlink channel can be updated.

(10) The first communication device or the second communication device may be configured to determine, based on a change in the dispersion compensation amount acquired by the first optical transceiver or the second optical transceiver connected to the optical fiber, whether or not to update the delay period in the uplink channel. Accordingly, when it can be determined that the transmission delay period of the optical fiber has changed, the delay period in the uplink channel can be updated.

(11) The control code may be a code word marker. Accordingly, the delay period can be estimated using the eCPRI signal.

(12) A communication device according to the present disclosure is a communication device configured to receive, from a first device, an original signal including a plurality of control codes communicated in time order, transmit, to an opposing device connected through an optical fiber, an optical signal including the original signal and information added to the original signal, the information being directed to the opposing device, receive, from the opposing device, an optical signal including the original signal and information added to the original signal, the information being from the opposing device, and transmit, to the first device, the original signal based on the received optical signal. The communication device includes a first optical transceiver connected to the optical fiber; an estimating unit configured to acquire, based on a dispersion compensation amount acquired by the first optical transceiver or a second optical transceiver included in the opposing device and connected to the optical fiber, an estimated value of a transmission delay period, the transmission delay period being a period during which the optical signal is transmitted through the optical fiber; a specifying unit configured to specify, based on the estimated value of the transmission delay period acquired by the estimating unit, a reception-related time when a transmission-related time is known, or the transmission-related time when the reception-related time is known, the transmission-related time being related to transmission of a control code by the communication device or the opposing device, the reception-related time being related to reception of the control code by the opposing device or the communication device; and a determining unit configured to determine, based on the transmission-related time and the reception-related time, the transmission delay period in a first transmission direction from the communication device toward the opposing device or a second transmission direction from the opposing device toward the communication device. Accordingly, based on the estimated transmission delay period, it is possible to specify the transmission-related time related to the time at which the communication device or the opposing device transmits one control code among the plurality of control codes transmitted in time series and the reception-related time related to the time at which the opposing device or the communication device receives the control code. Therefore, the delay period in the uplink channel and the delay period in the downlink channel can be accurately determined, and the asymmetric delay in the relay system corresponding to 5G can be measured.

(13) A delay period determination method according to an aspect of the present disclosure is a delay period determination method for determining, by a communication device, a delay period in a relay system in which the communication device and an opposing device are connected to each other through an optical fiber. The delay period determination method includes acquiring, based on a dispersion compensation amount acquired by a first optical transceiver included in the communication device and connected to the optical fiber or a second optical transceiver included in the opposing device and connected to the optical fiber, an estimated value of a transmission delay period, the transmission delay period being a period during which the optical signal is transmitted through the optical fiber; specifying, based on the estimated value of the transmission delay period acquired by the estimating unit, a reception-related time when a transmission-related time is known, or the transmission-related time when the reception-related time is known, the transmission-related time being related to transmission of a control code by the communication device or the opposing device, the reception-related time being related to reception of the control code by the opposing device or the communication device; and determining, based on the transmission-related time and the reception-related time, the transmission delay period in a first transmission direction from the communication device toward the opposing device or a second transmission direction from the opposing device toward the communication device. Accordingly, based on the estimated transmission delay period, it is possible to specify the transmission-related time related to the time at which the communication device or the opposing device transmits one control code among the plurality of control codes transmitted in time series and the reception-related time related to the time at which the opposing device or the communication device receives the control code. Therefore, the delay period in the uplink channel and the delay period in the downlink channel can be accurately determined, and the asymmetric delay in the relay system corresponding to 5G can be measured.

DETAILS OF EMBODIMENTS OF PRESENT DISCLOSURE

The details of embodiments of the present disclosure will now be described with reference to the drawings. At least part of the embodiments described below may be arbitrarily combined.

1. First Embodiment 1-1. Configuration of Relay System

FIG. 1 is a schematic diagram showing an example of a configuration of a communication system 10 according to a first embodiment. Communication system 10 shown in FIG. 1 is a mobile front-haul. Communication system 10 includes a baseband unit (hereinafter referred to as "BBU") 20 and a remote radio head (hereinafter referred to as "RRH") 30. BBU 20 is a signal processor of a base transceiver station. RRH 30 is an antenna of the base transceiver station.

Communication system 10 includes a relay system 100 between BBU 20 and RRH 30. Relay system 100 relays communication between BBU 20 and RRH 30. Although relay system 100 applied to the MFH is described in the embodiment of the present disclosure, it is not limited thereto. Relay system 100 may be applied to the MBH or the MMH.

Relay system 100 includes a first communication device 200 and a second communication device 300. First communication device 200 and second communication device 300 are communication devices compliant with the OTN that is a communication standard defined by the International Telecommunication Union Telecommunication Standardization Sector (ITU-T), and are optical transmission devices for communication signals in 5G. First communication device 200 is connected to BBU 20 by an optical fiber cable 21. Second communication device 300 is connected to RRH 30 by an optical fiber cable 31. First communication device 200 and second communication device 300 are connected to each other via a single optical fiber cable 250. Optical fiber cable 250 has a length of 20 km or more, for example. As optical fiber cable 250, for example, a dark fiber is used.

First communication device 200 is a master device that measures a transmission delay period in relay system 100, and second communication device 300 is a slave device. First communication device 200 measures a delay period in an uplink channel and a delay period in a downlink channel of relay system 100 by communicating with second communication device 300.

1-2. Configuration of First Communication Device

Figure 2:
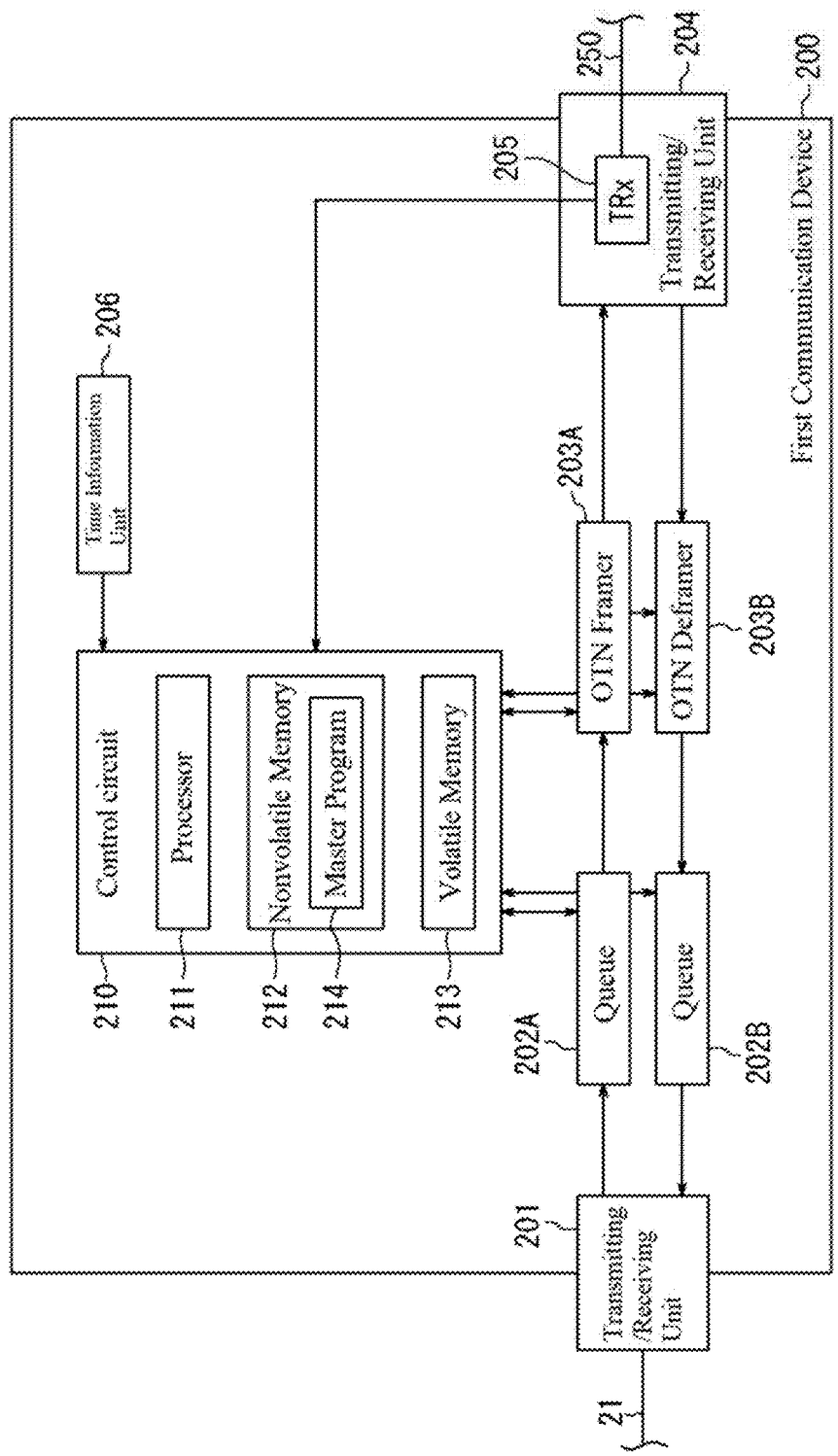
FIG. 2 is a block diagram showing an example of a configuration of a first communication device according to the first embodiment.

FIG. 2 is a block diagram showing an example of a configuration of the first communication device according to the first embodiment. First communication device 200 includes a transmitting/receiving unit 201, queues 202A and 202B, an OTN framer 203A, an OTN deframer 203B, a transmitting/receiving unit 204, a time information unit 206, and a control circuit 210.

Transmitting/receiving unit 201 is a client port connected to BBU 20. Transmitting/receiving unit 201 is connected to optical fiber cable 21. Transmitting/receiving unit 201 includes an optical transceiver corresponding to 25G Ethernet (hereinafter, also referred to as "25GE", "Ethernet" is a registered trademark.). Transmitting/receiving unit 201 interconverts an optical signal and an electrical signal. Transmitting/receiving unit 201 includes, for example, a serial/parallel converter, a transmitting circuit, and a receiving circuit. Transmitting/receiving unit 201 converts the received serial optical signal into a serial electrical signal, and further performs serial/parallel conversion on the serial electrical signal. Transmitting/receiving unit 201 divides the obtained parallel electrical signal into blocks and writes the divided blocks to queue 202A.

Queue 202A is a FIFO (First In, First Out) buffer. Queue 202A is an example of a reception queue. Queue 202A is configured by a hardware circuit including, for example, a field programmable gate array (FPGA). Queue 202A includes a write pointer that specifies a write destination address and a read pointer that specifies a read destination address. Transmitting/receiving unit 201 writes the block data to the address designated by the write pointer.

OTN framer 203A converts the client signal (eCPRI signal) received from BBU 20 into an OTN frame. OTN framer 203A is an example of a framer. OTN framer 203A reads block data from an address designated by the read pointer of queue 202A and generates an OTN frame (transmission frame) accommodating the read block data. OTN framer 203A outputs the generated OTN frame to transmitting/receiving unit 204. OTN framer 203A is configured as, for example, a large scale integration (LSI).

Transmitting/receiving unit 204 is a relay port connected to second communication device 300 which is an opposing device. Transmitting/receiving unit 204 is connected to optical fiber cable 250. Transmitting/receiving unit 204 includes a coherent optical transceiver 205 capable of transmitting and receiving an optical signal at a transmission rate of, for example, 100 Gbps or more. Transmitting/receiving unit 204 includes, for example, a transmitting circuit and a receiving circuit.

Transmitting/receiving unit 204 receives an optical signal transmitted from second communication device 300. Transmitting/receiving unit 204 converts the received optical signal into an electrical signal and outputs an OTN frame of the obtained electrical signal to OTN deframer 203B.

Coherent optical transceiver 205 can measure a dispersion compensation amount of optical fiber cable 250. The measured dispersion compensation amount is stored in a register included in coherent optical transceiver 205.

OTN deframer 203B converts the OTN frame received from second communication device 300 into a client signal (eCPRI signal). OTN deframer 203B is an example of a deframer. OTN deframer 203B extracts block data from the input OTN frame (second transmission frame). OTN deframer 203B writes the block data to the address designated by the write pointer of queue 202B. OTN deframer 203B is configured as, for example, an LSI.

Queue 202B is a FIFO (First In, First Out) buffer. Queue 202A is an example of a transmission queue. The configuration of queue 202B is similar to the configuration of queue 202A. OTN deframer 203B writes the block data to the address designated by the write pointer.

Transmitting/receiving unit 201 reads block data from the address designated by the read pointer of queue 202B, and performs parallel/serial conversion on the read block data. Transmitting/receiving unit 201 converts the obtained serial electrical signal into a serial optical signal and transmits the serial optical signal to optical fiber cable 21.

Time information unit 206 outputs time information indicating the current time to control circuit 210. The time information is used for time synchronization in relay system 100.

Control circuit 210 includes, for example, a processor 211, a nonvolatile memory 212, and a volatile memory 213.

Volatile memory 213 is, for example, a semiconductor memory such as a static random access memory (SRAM) or a dynamic random access memory (DRAM).

Nonvolatile memory 212 is, for example, a flash memory, a hard disk, a read only memory (ROM), or the like. Nonvolatile memory 212 stores a master program 214, which is a computer program, and data used for execution of master program 214. First communication device 200 is configured to include a computer, and each function of first communication device 200 is exhibited by processor 211 executing master program 214 which is a computer program stored in a storage device of the computer.

Master program 214 is a computer program for measuring a delay period in each of a downlink channel and an uplink channel of relay system 100 by communicating with second communication device 300 which is a slave device.

Processor 211 is, for example, a central processing unit (CPU). However, processor 211 is not limited to the CPU. Processor 211 may be a graphics processing unit (GPU). In one specific example, processor 211 is a multi-core GPU. Processor 211 is configured to be able to execute a computer program. However, processor 211 may include, for example, an application specific integrated circuit (ASIC) as a part thereof, or may include a programmable logic device such as a gate array or a field programmable gate array (FPGA) as a part thereof.

1-3. Configuration of Second Communication Device

Figure 3:
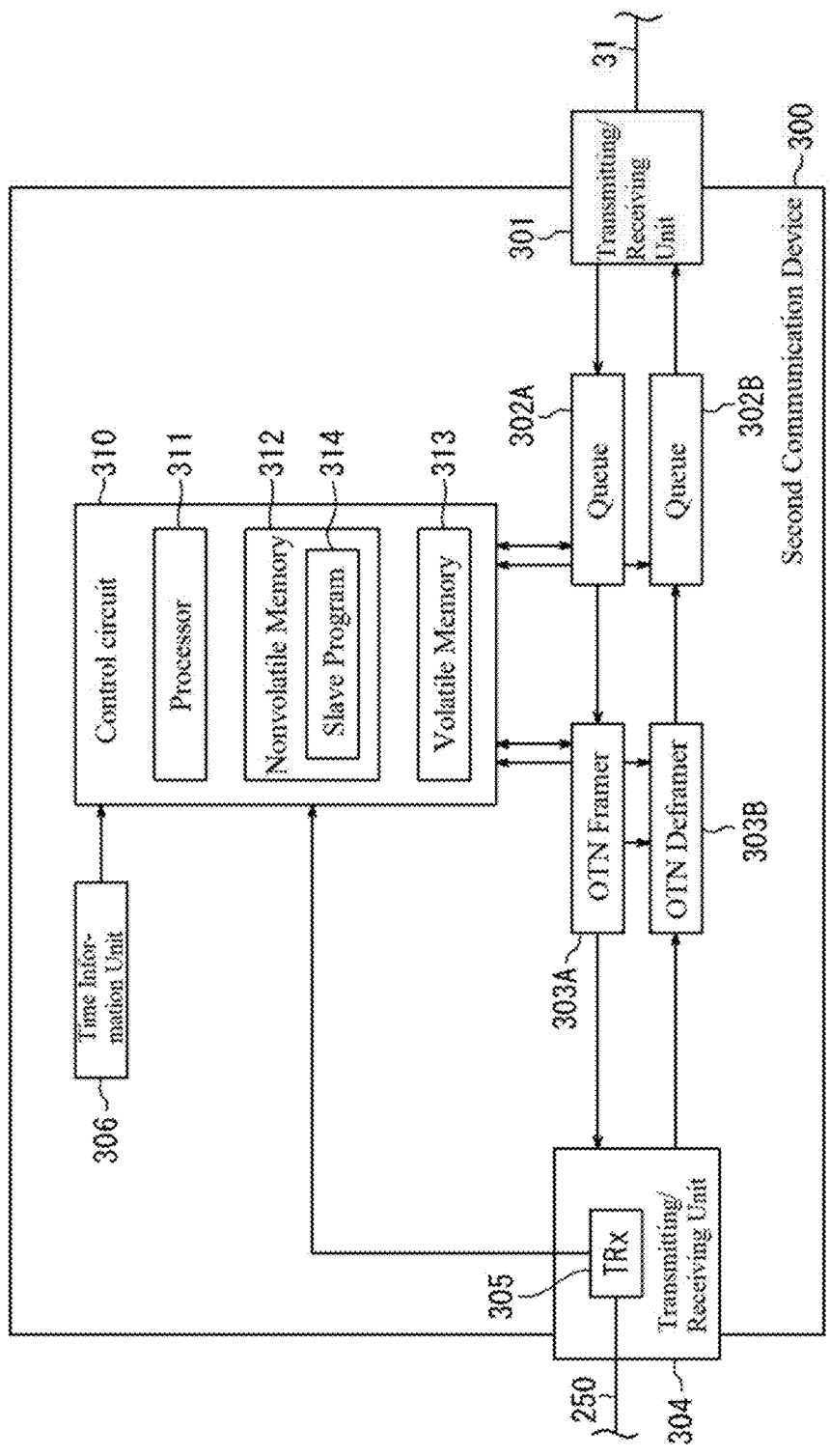
FIG. 3 is a block diagram showing an example of a configuration of a second communication device according to the first embodiment.

FIG. 3 is a block diagram showing an example of a configuration of the second communication device according to the first embodiment. Second communication device 300 includes a transmitting/receiving unit 301, queues 302A and 302B, an OTN framer 303A, an OTN deframer 303B, a transmitting/receiving unit 304, a time information unit 306, and a control circuit 310. Transmitting/receiving unit 301 is a client port connected to RRH 30. Transmitting/receiving unit 304 is a relay port connected to second communication device 300 which is an opposing device. Queue 302A is an example of a reception queue, and queue 302B is an example of a transmission queue. OTN framer 303A is an example of a framer, and OTN deframer 303B is an example of a deframer.

The configurations of transmitting/receiving unit 301, queues 302A and 302B, OTN framer 303A, OTN deframer 303B, and transmitting/receiving unit 304 are the same as the configurations of transmitting/receiving unit 201, queues 202A and 202B, OTN framer 203A, OTN deframer 203B, and transmitting/receiving unit 204, description thereof will be omitted.

Similarly to time information unit 206, time information unit 306 outputs time information indicating the current time to control circuit 310.

Control circuit 310 includes, for example, a processor 311, a nonvolatile memory 312, and a volatile memory 313. The configurations of processor 311, nonvolatile memory 312, and volatile memory 313 are the same as the configurations of processor 211, nonvolatile memory 212, and volatile memory 213 described above.

Nonvolatile memory 212 stores a slave program 314, which is a computer program, and data used to execute slave program 314. Second communication device 300 is configured to include a computer, and each function of second communication device 300 is exhibited by executing slave program 314, which is a computer program stored in a storage device of the computer, by processor 311.

Slave program 314 is a computer program for providing first communication device 200 with information for measuring the delay period in each of the downlink channel and the uplink channel of relay system 100 by communicating with first communication device 200 which is the master device.

1-4. Function of Relay System

Figure 4:
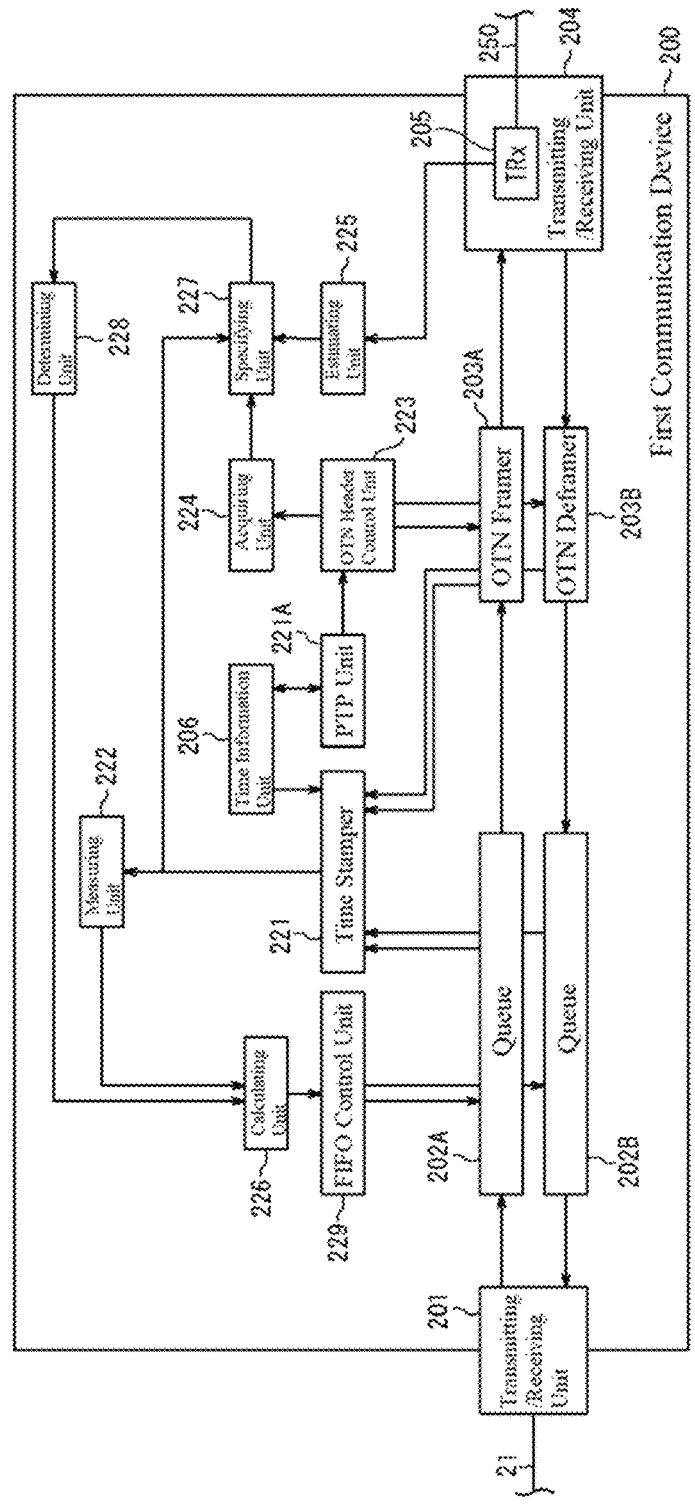
FIG. 4 is a functional block diagram showing an example of functions of the first communication device according to the first embodiment.
Figure 5:
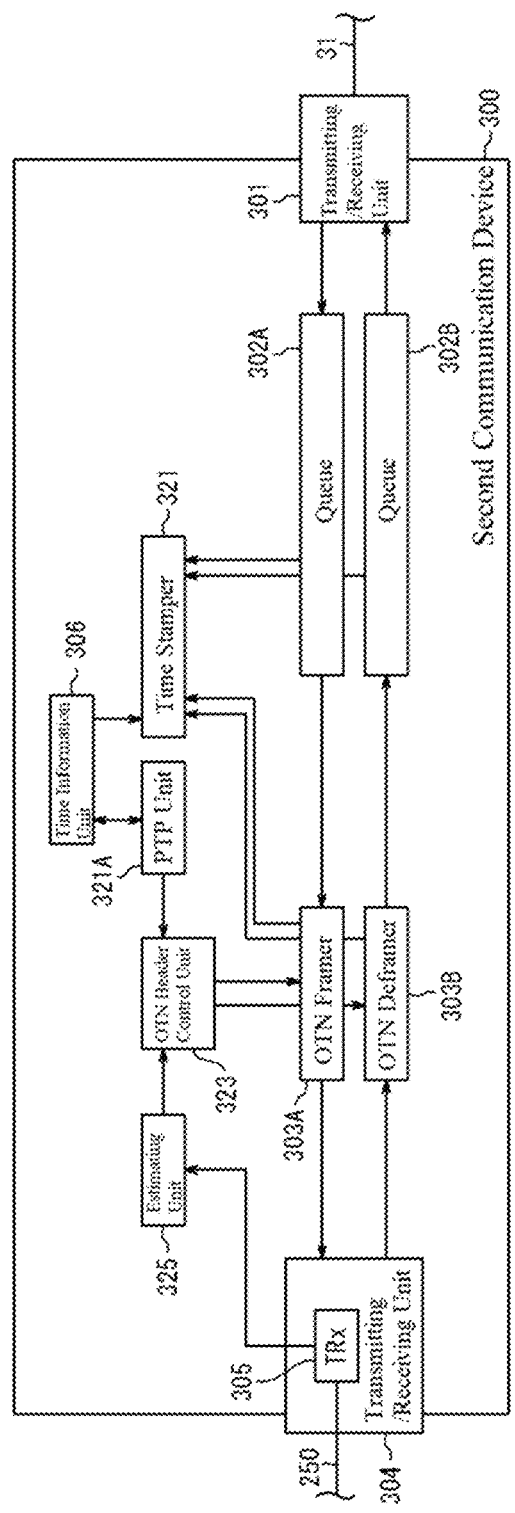
FIG. 5 is a functional block diagram showing an example of functions of the second communication device according to the first embodiment.

FIG. 4 is a functional block diagram showing an example of the functions of the first communication device according to the first embodiment, and FIG. 5 is a functional block diagram showing an example of the functions of the second communication device according to the first embodiment. When processor 211 executes master program 214, the functions of a time stamper 221, a PTP unit 221A, a measuring unit 222, an OTN header control unit 223, an acquiring unit 224, an estimating unit 225, a calculating unit 226, a specifying unit 227, a determining unit 228, and an FIFO control unit 229 are achieved. When processor 311 executes slave program 314, the functions of a time stamper 321, a PTP unit 321A, an OTN header control unit 323, and an estimating unit 325 are achieved.

Figure 6:
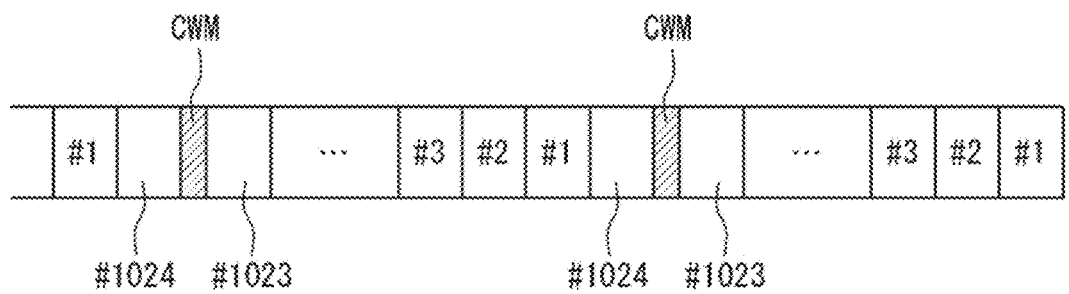
FIG. 6 is a diagram schematically showing a configuration of an eCPRI signal.

FIG. 6 is a diagram schematically showing the structure of an eCPRI signal. In the embodiment of the present disclosure, the delay period in each of the downlink channel and the uplink channel is measured using a code word marker (CWM), which is a control code defined in 25GBASE-R. RS (528,514) FEC (RS: Reed-Solomon, FEC: Error Correction) is used for 25GE. The block length of RS (528,514) FEC is 5280 bits, and the CWM is arranged every 1024 blocks.

Reference is made to FIG. 4. PTP unit 221A of first communication device 200 acquires time information from time information unit 206. Also in second communication device 300, PTP unit 321A can acquire the time information from time information unit 306 (see FIG. 5). First communication device 200 is a master device, and second communication device 300 is a slave device. First communication device 200 and second communication device 300 transmit and receive an OTN frame for time synchronization. The OTN frame includes an OTN header, and time information is stored in the OTN header. First communication device 200 and second communication device 300 transmit and receive the time information acquired by PTP units 221A and 321A in accordance with the PTP (Precision Time Protocol) defined in IEEE1588, and match the times of both devices. Time stamper 221 receives time information from time information unit 206 and stores a time stamp. Time stamper 221 is an example of a first time acquiring unit. Time stamper 221 acquires a first reception time A at which first communication device 200 receives the CWM included in the eCPRI signal (downlink original signal) transmitted from BBU 20, and a first transmission time A' at which first communication device 200 transmits the CWM included in the downlink original signal.

Figure 7A:
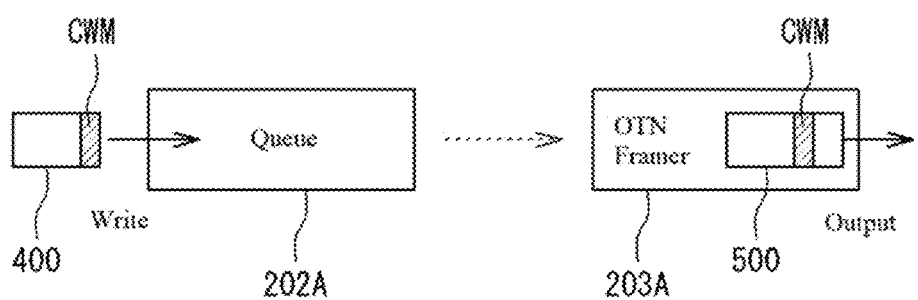
FIG. 7A is a diagram for explaining acquisition of a first reception time and a first transmission time.

FIG. 7A is a diagram for explaining acquisition of a first reception time and a first transmission time. Transmitting/receiving unit 201 divides the eCPRI signal received from BBU 20 into a plurality of blocks and writes each block to queue 202A in chronological order. The block to be divided may be the block of RS (528,514) FEC described above, or may be a block of another unit (for example, several RSFEC blocks). Time stamper 221 acquires the time at which a block 400 including the CWM is written from transmitting/receiving unit 201 to queue 202A as first reception time A.

Block 400 including the CWM is read from queue 202A by OTN framer 203A. OTN framer 203A generates an OTN frame 500 including the CWM from block 400 including the CWM and outputs OTN frame 500 to transmitting/receiving unit 204. Time stamper 221 acquires the time at which OTN frame 500 including the CWM is output from OTN framer 203A to transmitting/receiving unit 204 as first transmission time A'. The time at which block 400 including the CWM is input to OTN framer 203A may be set as first transmission time A'. First transmission time A' is not limited to these times as long as it is a time related to the transmission of the CWM from first communication device 200 to second communication device 300. First transmission time A' is output to specifying unit 227 and is stored for a predetermined time in specifying unit 227.

Figure 8:
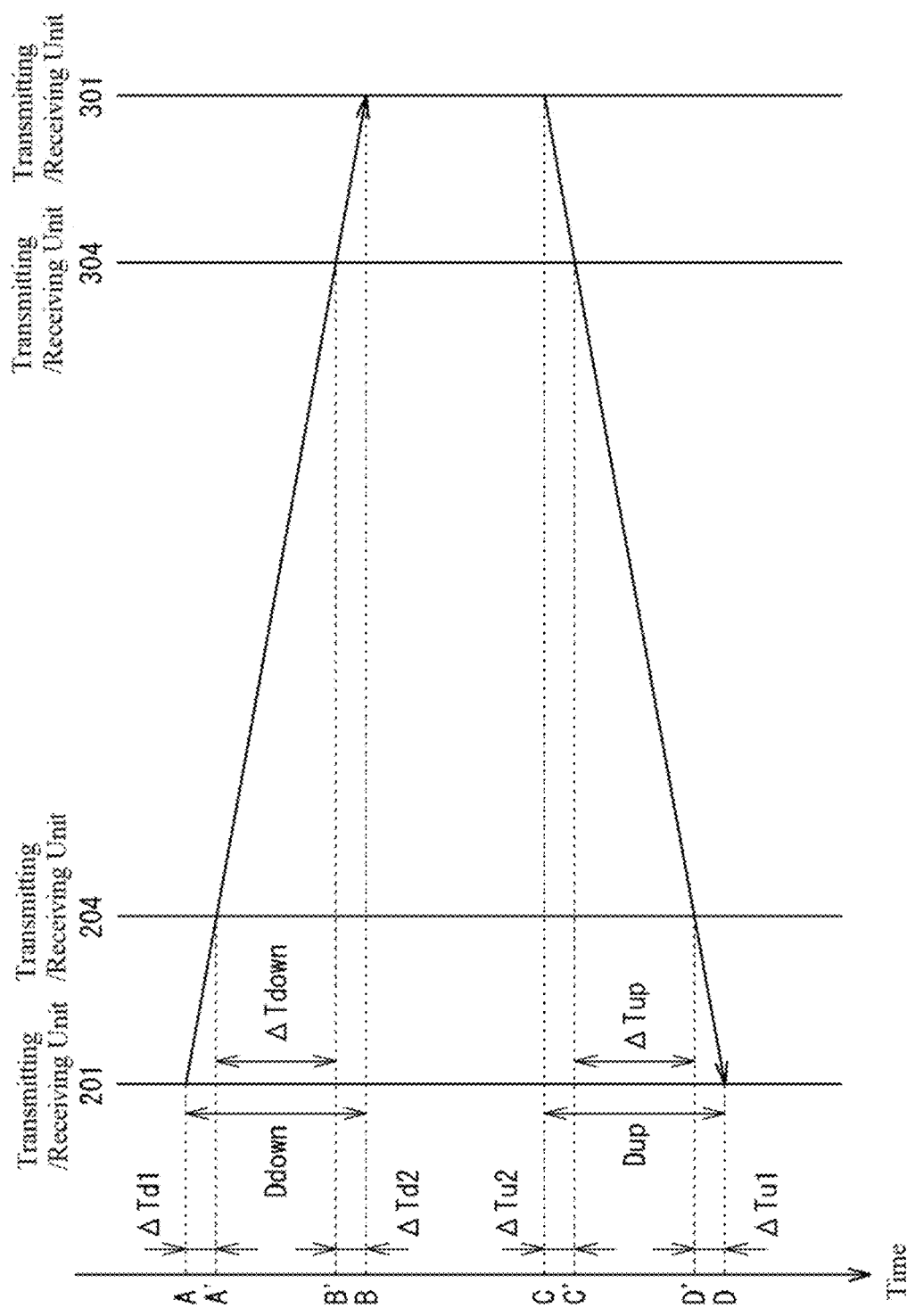
FIG. 8 is a diagram for explaining a delay period in a relay system.

Reference is again made to FIG. 4. Measuring unit 222 measures a delay period ΔTd1 in first communication device 200 on the downlink channel based on first transmission time A' and first reception time A acquired by time stamper 221. FIG. 8 is a diagram for explaining a delay period in a relay system. First reception time A is a time at which the CWM passes through transmitting/receiving unit 201 of first communication device 200, and first transmission time A' is a time at which the CWM is output from OTN framer 203A (or a time at which the CWM is input to OTN framer 203A). Measuring unit 222 calculates delay period ΔTd1 in first communication device 200 as difference A'-A between first transmission time A' and first reception time A. The timing of calculation of ΔTd1 is not limited. ΔTd1 may be calculated once before the delay period adjustment processing described later. ΔTd1 may not be calculated but may be given as a design value.

Reference is made to FIG. 5. Time stamper 321 acquires time information from time information unit 306 and stores a time stamp. Time stamper 321 is an example of a second time acquiring unit. Time stamper 321 acquires a second reception time B' at which second communication device 300 receives the CWM transmitted from first communication device 200 and a second transmission time B at which second communication device 300 transmits the CWM to RRH 30.

Figure 7B:
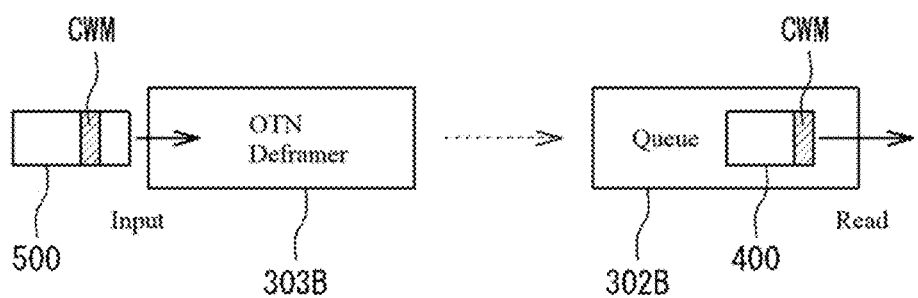
FIG. 7B is a diagram for explaining acquisition of a second reception time and a second transmission time.

FIG. 7B is a diagram for explaining acquisition of a second reception time and a second transmission time. OTN frame 500 transmitted from first communication device 200 is received by transmitting/receiving unit 304. Transmitting/receiving unit 304 outputs the received OTN frame 500 to OTN deframer 303B. Time stamper 321 acquires a time at which transmitting/receiving unit 304 inputs the OTN frame including the CWM to OTN deframer 303B as second reception time B'. The time at which block 400 including the CWM is output from OTN deframer 303B may be set as second reception time B'. However, second reception time B' is not limited to these times as long as it is a time related to reception of the CWM transmitted from first communication device 200 in second communication device 300.

OTN deframer 303B extracts block 400 including the CWM from OTN frame 500 and writes block 400 to queue 302B. Transmitting/receiving unit 301 reads block 400 from queue 302B. Time stamper 321 acquires a time at which transmitting/receiving unit 301 reads block 400 including the CWM from queue 302B as second transmission time B.

Reference is again made to FIG. 5. OTN header control unit 323 inserts information into the OTN header and extracts information from the OTN header. OTN header control unit 323 is an example of a notifying unit. OTN header control unit 323 inserts second reception time B' and second transmission time B acquired by time stamper 321 into the OTN header. When the OTN frame in which second reception time B' and second transmission time B are inserted into the header is transmitted to first communication device 200, second reception time B' and second transmission time B are notified to first communication device 200.

Reference is again made to FIG. 4. OTN header control unit 223 extracts second reception time B' and second transmission time B from the header of the OTN frame transmitted from second communication device 300. Acquiring unit 224 acquires second reception time B' and second transmission time B extracted by OTN header control unit 223. Second transmission time B' is output to specifying unit 227 and is stored for a predetermined time in specifying unit 227.

Acquiring unit 224 acquires a delay period ΔTd2 in second communication device 300 on the downlink channel based on the acquired second transmission time B and second reception time B'. Reference is again made to FIG. 8. Second reception time B' is a time at which the CWM is input to OTN deframer 303B of second communication device 300 (or a time at which the CWM is output from OTN deframer 303B), and second transmission time B is a time at which the CWM passes through transmitting/receiving unit 301. Acquiring unit 224 calculates a delay period ΔTd2 in second communication device 300 as difference B-B' between second transmission time B and second reception time B'. The timing of calculation of ΔTd2 is not limited. ΔTd2 may be calculated once before the delay period adjustment processing described later. ΔTd2 may not be calculated but may be given as a design value.

Reference is again made to FIG. 5. Estimating unit 325 estimates a transmission delay period during which the optical signal is transmitted through the optical fiber 250 based on the dispersion compensation amount acquire by a coherent optical transceiver 305. The transmission time in the optical fiber is affected by the dispersion amount of the optical fiber. Coherent optical transceiver 305 has a function of measuring a dispersion compensation amount for compensating for dispersion. For example, estimating unit 325 calculates an estimated value ΔETdown of the transmission delay period from the dispersion compensation amount acquired by coherent optical transceiver 305. As an example, when the average value of the dispersion compensation amount in 30 km optical fiber cable 250 is 493 [ps/nm], estimated value ΔETdown of the transmission delay period is calculated as 135 [μs] by the following equation.

493 [ps/nm]/(17 [ps/nm*km]×200000 [km/s])=135 [μs]

Note that 17 [ps/nm*km] is an example of the single-mode fiber dispersion characteristic defined by ITU-T G.762, and 200000 [km/s] is an example of the speed of light in the optical fiber.

OTN header control unit 323 inserts estimated value ΔETdown of the transmission delay period acquire by estimating unit 325 into the OTN header. When the OTN frame in which transmission delay period ΔETdown is inserted into the header is transmitted to first communication device 200, estimated value ΔETdown of the transmission delay period in the downlink channel is notified to first communication device 200.

Reference is again made to FIG. 4. OTN header control unit 223 extracts estimated value ΔETdown of the transmission delay period in the downlink channel from the header of the OTN frame transmitted from second communication device 300. Acquiring unit 224 acquires estimated value ΔETdown of the transmission delay period in the downlink channel extracted by OTN header control unit 223.

Reference is made to FIG. 5. Time stamper 321 acquires a third reception time C at which second communication device 300 receives the CWM included in the eCPRI signal (uplink original signal) transmitted from RRH 30, and a third transmission time C' at which second communication device 300 transmits the CWM included in the uplink original signal.

Transmitting/receiving unit 301 divides the eCPRI signal received from RRH 30 into a plurality of blocks and writes each block to queue 302A in chronological order. Time stamper 321 acquires the time at which block 400 including the CWM is written from transmitting/receiving unit 301 to queue 302A as third reception time C (see FIG. 7A).

OTN framer 303A generates OTN frame 500 including the CWM from block 400 including the CWM and outputs OTN frame 500 to transmitting/receiving unit 304. Time stamper 321 acquires the time at which OTN frame 500 including the CWM is output from OTN framer 303A to transmitting/receiving unit 304 as third transmission time C' (see FIG. 7A). The time at which block 400 including the CWM is input to OTN framer 303A may be set as third transmission time C'. However, third transmission time C' is not limited to these times as long as it is a time related to the transmission of the CWM from second communication device 300 to first communication device 200.

OTN header control unit 323 inserts third reception time C and third transmission time C' acquired by time stamper 321 into the OTN header. When the OTN frame in which third reception time C and third transmission time C' are inserted into the header is transmitted to first communication device 200, first communication device 200 is notified of third reception time C and third transmission time C'.

Reference is again made to FIG. 4. OTN header control unit 223 extracts third reception time C and third transmission time C' from the header of the OTN frame transmitted from second communication device 300. Acquiring unit 224 acquires third reception time C and third transmission time C' extracted by OTN header control unit 223. Third transmission time C' is output to specifying unit 227 and is stored for a predetermined time in specifying unit 227.

Acquiring unit 224 acquires a delay period ΔTu2 in second communication device 300 on the uplink channel based on the acquired third transmission time C' and third reception time C. Reference is again made to FIG. 8. Third reception time C is a time at which the CWM passes through transmitting/receiving unit 304 of second communication device 300, and third transmission time C' is a time at which the CWM is output from OTN framer 303A (or a time at which the CWM is input to OTN framer 303A). Acquiring unit 224 calculates delay period ΔTu2 in second communication device 300 as difference C'-C between third transmission time C' and third reception time C. The timing of calculation of ΔTu2 is not limited. ΔTu2 may be calculated once before the delay period adjustment processing described later. ΔTu2 may not be calculated but may be given as a design value.

Reference is again made to FIG. 4. Time stamper 221 acquires a fourth reception time D' at which first communication device 200 receives the CWM transmitted from second communication device 300 and a fourth transmission time D at which first communication device 200 transmits the CWM to BBU 20.

OTN frame 500 transmitted from second communication device 300 is received by transmitting/receiving unit 204. Time stamper 221 acquires the time at which transmitting/receiving unit 204 inputs the OTN frame including the CWM to OTN deframer 203B as fourth reception time D' (see FIG. 7B). The time at which block 400 including the CWM is output from OTN deframer 203B may be set as fourth reception time D'. However, fourth reception time D' is not limited to these times as long as it is a time related to reception of the CWM transmitted from second communication device 300 in first communication device 200. Fourth transmission time D' is output to specifying unit 227 and stored for a predetermined time in specifying unit 227.

OTN deframer 203B extracts block 400 including the CWM from OTN frame 500 and writes block 400 to queue 202B. Time stamper 221 acquires the time at which transmitting/receiving unit 201 reads block 400 including the CWM from queue 202B as fourth transmission time D (see FIG. 7B).

Measuring unit 222 measures a delay period ΔTu1 in first communication device 200 on the uplink channel based on fourth transmission time D and fourth reception time D' acquired by time stamper 221. Reference is again made to FIG. 8. Fourth reception time D' is a time at which the CWM is input to OTN deframer 203B of first communication device 200 (or a time at which the CWM is output from OTN deframer 203B), and fourth transmission time D is a time at which the CWM passes through transmitting/receiving unit 201. Measuring unit 222 calculates delay period ΔTu1 in first communication device 200 as difference D-D' between fourth transmission time D and fourth reception time D'. The timing of calculation of ΔTu1 is not limited. ΔTu1 may be calculated once before the delay period adjustment processing described later. ΔTu1 may not be calculated but may be given as a design value.

Estimating unit 225 calculates an estimated value ΔETup of the transmission delay period of optical fiber cable 250 in the uplink channel based on the dispersion compensation amount acquired by coherent optical transceiver 205.

As described above, specifying unit 227 stores first transmission time A', second reception time B', third transmission time C' and fourth reception time D'. Hereinafter, the time-series first transmission times A' stored by specifying unit 227 are referred to as A1, A2, A3, . . . , and An, the time-series second reception times B' are referred to as B1, B2, B3, . . . , and Bn, the time-series third transmission times C' are referred to as C1, C2, C3, . . . , and Cn, and the time-series fourth reception times D' are referred to as, D1, D2, D3, . . . , and Dn.

Specifying unit 227 specifies a first time Ak at which first communication device 200 receives one (first control code) of the plurality of CWMs transmitted in time series from BBU 20 and a second time Bk at which second communication device 300 transmits the first control code to RRH 30. First time Ak is an example of a transmission-related time, and second time Bk is an example of a reception-related time.

Figure 9:
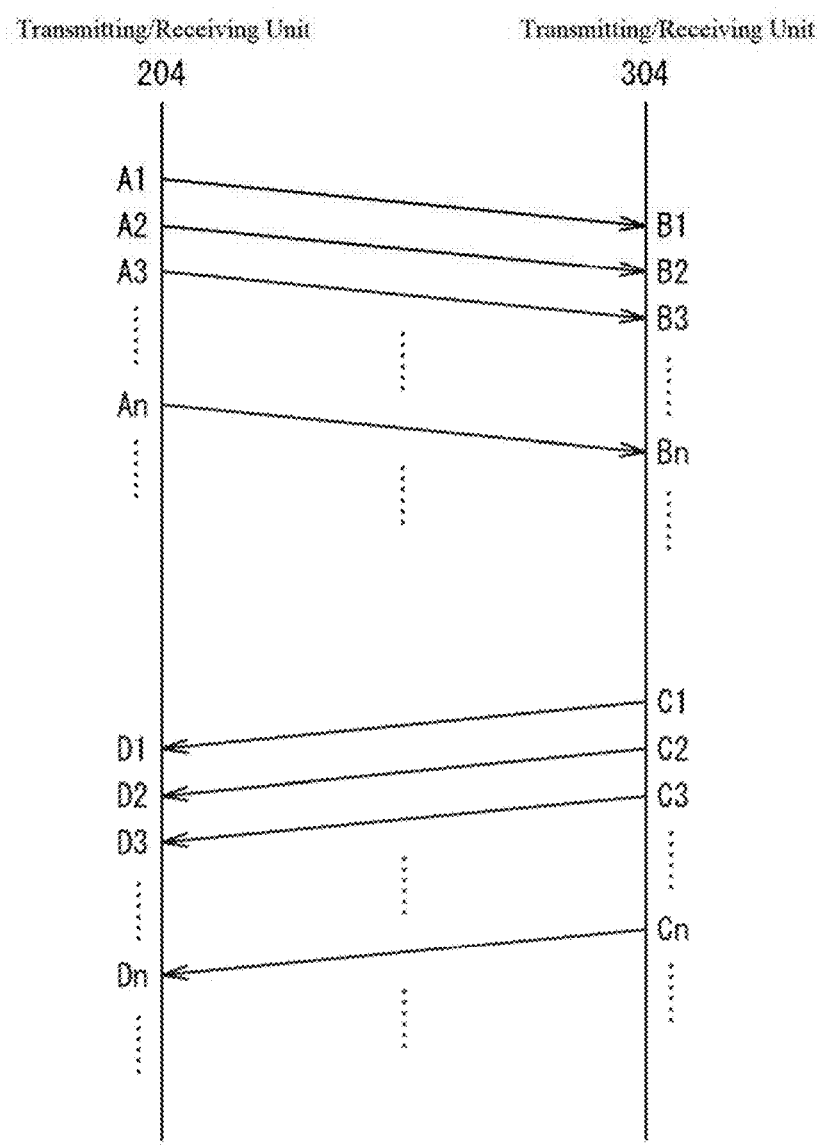
FIG. 9 is a diagram for explaining the specifying of the first time An and the second time Bn by the specifying unit.

FIG. 9 is a diagram for explaining the specification of a first time An and a second time Bn by the specifying unit. When first transmission time A' is acquired at time A1, second reception time B' is acquired at time B1. That is, time A1 correspond to time B1. Similarly, time A2 corresponds to time B2, time A3 corresponds to a time B3, and time An corresponds to time Bn.

For example, specifying unit 227 selects one time Ak from among times A1, A2, A3, . . . , and An. Specifying unit 227 calculates time Ak+ΔETdown by adding estimated value ΔETdown of the transmission delay period in the downlink channel to time An. Specifying unit 227 specifies time Bk closest to time Ak+ΔETdown among times B1, B2, B3, . . . , and Bn.

Reference is again made to FIG. 4. Specifying unit 227 specifies a third time Ck at which second communication device 300 receives one (second control code) of the plurality of CWMs from RRH 30 and a fourth time Dk at which first communication device 200 transmits the second control code to BBU 20. Third time Ck is an example of a transmission-related time, and fourth time Dk is an example of a reception-related time.

Reference is again made to FIG. 9. For example, specifying unit 227 selects one time Dk from among times D1, D2, D3, . . . , and Dn. Specifying unit 227 calculates time Dk-ΔETup by subtracting estimated value ΔETup of the transmission delay period in the uplink channel from time Dk. Specifying unit 227 specifies time Ck closest to time Dk-ΔETup among times C1, C2, C3, . . . , and Cn.

Reference is again made to FIG. 4. Determining unit 228 is determines a transmission delay period ΔTdown in the downlink channel based on the determined first time Ak and second time Bk. That is, determining unit 228 determines difference Bk-Ak between second time Bk and first time Ak as transmission delay period ΔTdown.

Calculating unit 226 calculates a relay delay period Ddown in the downlink channel of relay system 100 by adding delay period ΔTd1 in the first communication device measured by measuring unit 222, transmission delay period ΔTdown determined by determining unit 228, and delay period ΔTd2 in the second communication device acquired by acquiring unit 224. Referring to FIG. 8, relay delay period Ddown in the downlink channel is a transmission time of a signal from transmitting/receiving unit 201 which is a client port of first communication device 200 to transmitting/receiving unit 301 which is a client port of second communication device 300.

Reference is again made to FIG. 4. Determining unit 228 is determines a transmission delay period ΔTup in the uplink channel based on the determined third time Ck and fourth time Dk. That is, determining unit 228 determines difference Dk-Ck between fourth time Dk and third time Ck as the transmission delay period ΔTup.

Calculating unit 226 calculates a relay delay period Dup in the uplink channel of relay system 100 by adding delay period ΔTu2 in the second communication device acquired by acquiring unit 224, transmission delay period ΔTup determined by determining unit 228, and delay period ΔTu1 in the first communication device measured by measuring unit 222. Referring to FIG. 8, relay delay period Dup in the uplink channel is an estimated value of a transmission time of a signal from transmitting/receiving unit 301 which is a client port of second communication device 300 to transmitting/receiving unit 201 which is a client port of first communication device 200.

FIFO control unit 229 controls the read timing of queue 202A or 202B of first communication device 200 based on relay delay period Ddown in the downlink channel and relay delay period Dup in the uplink channel. For example, FIFO control unit 229 specifies one of the uplink channel and the downlink channel having a shorter delay period. FIFO control unit 229 calculates the difference between Ddown and Dup, and delays the read timing from one of queue 202A and 202B, the one having the shorter delay period, by the calculated difference time. For example, when relay delay period Ddown in the downlink channel is shorter than relay delay period Dup in the uplink channel, FIFO control unit 229 controls the read pointer of queue 202A to delay the timing of reading data from queue 202A by Ddown-Dup. When relay delay period Dup in the uplink channel is shorter than relay delay period Ddown in the downlink channel, FIFO control unit 229 controls the read pointer of queue 202B to delay the timing of reading data from queue 202B by Dup-Ddown. As a result, it is possible to suppress the asymmetry of delay in the uplink and downlink channels.

1-5. Operation of Relay System

When processor 211 of first communication device 200 activates master program 214 and processor 311 of second communication device 300 activates slave program 314, relay system 100 executes a delay period estimation processing in the downlink channel, a delay period estimation processing in the uplink channel, a delay period determination processing in the downlink channel, a delay period determination processing in the uplink channel, and a delay period adjustment processing as described later.

Processor 211 of first communication device 200 acquires the time information from time information unit 206 and transmits the OTN frame in which the PTP packet is inserted into the OTN header to second communication device 300. Second communication device 300 receives the OTN frame and extracts the PTP packet inserted into the OTN header. Processor 311 of second communication device 300 acquires the time information from time information unit 306 and transmits the OTN frame in which the PTP packet including the time information is inserted into the OTN header to first communication device 200. Processors 211 and 311 execute time synchronization between first communication device 200 and second communication device 300 by transmitting and receiving the PTP packet. In a state in which time synchronization is achieved as described above, the delay period determination processing in the downlink channel, the delay period determination processing in the uplink channel, and the delay period adjustment processing are executed.

Figure 10:
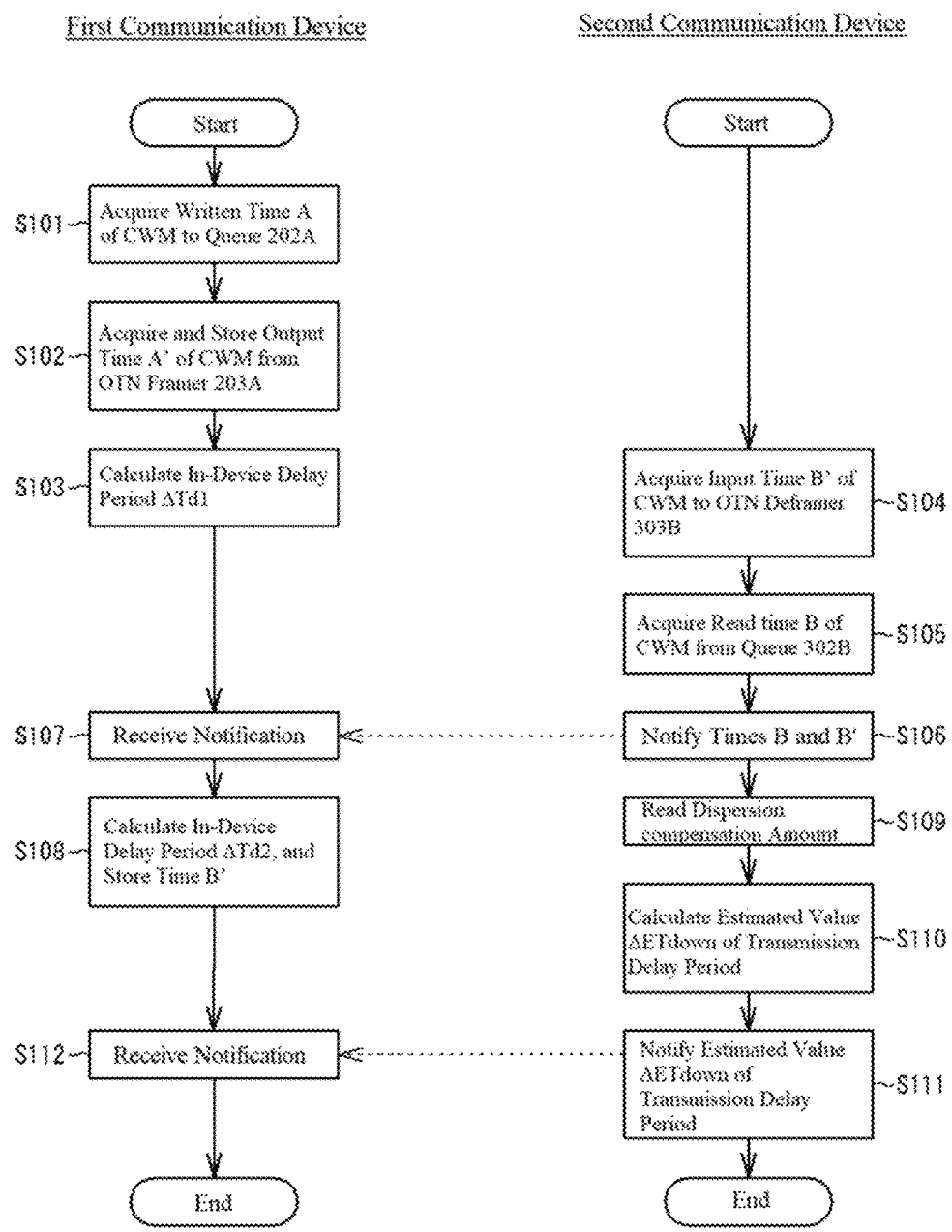
FIG. 10 is a flowchart showing an example of a procedure of delay period estimation processing in a downlink channel by the relay system according to the first embodiment.

FIG. 10 is a flowchart showing an example of a procedure of delay period estimation processing in a downlink channel by relay system 100 according to the first embodiment.

Processor 211 of first communication device 200 acquires a written time A of block 400 including the CWM to queue 202A (step S101). Further, processor 211 acquires and stores an output time A' of OTN frame 500 including the CWM from OTN framer 203A (or an input time A' of block 400 including the CWM to OTN framer 203A) (step S102). Processor 211 calculates delay period $\Delta Td1$ in first communication device 200 in the downlink channel by calculating the difference between time A' and time A (step S103).

Processor 311 of second communication device 300 acquires an input time B' of OTN frame 500 including the CWM to OTN deframer 303B (or output time B' of block 400 including the CWM from OTN deframer 303B) (step S104). Further, processor 311 acquires a read time B of block 400 including the CWM from queue 302B (step S105). Processor 311 inserts times B and B' into the OTN header and notifies first communication device 200 of times B and B' (step S106).

First communication device 200 receives the OTN frame including times B and B' in the OTN header (step S107). Processor 211 calculates a difference between time B and time B' to calculate delay period $\Delta Td2$ in second communication device 300 in the downlink channel, and stores time B' (step S108).

Processor 311 of second communication device 300 reads the dispersion compensation amount from the register of coherent optical transceiver 305 (step S109). Processor 311 calculates estimated value $\Delta ETdown$ of the transmission delay period in the downlink channel based on the read dispersion compensation amount (step S110).

Processor 311 inserts estimated value $\Delta ETdown$ of the transmission delay period into the OTN header and notifies first communication device 200 of estimated value $\Delta ETdown$ (step S111).

First communication device 200 receives the OTN frame including transmission delay period $\Delta Tdown$ in the OTN header (step S112). Thus, the delay period estimation processing in the downlink channel is completed.

Figure 11:
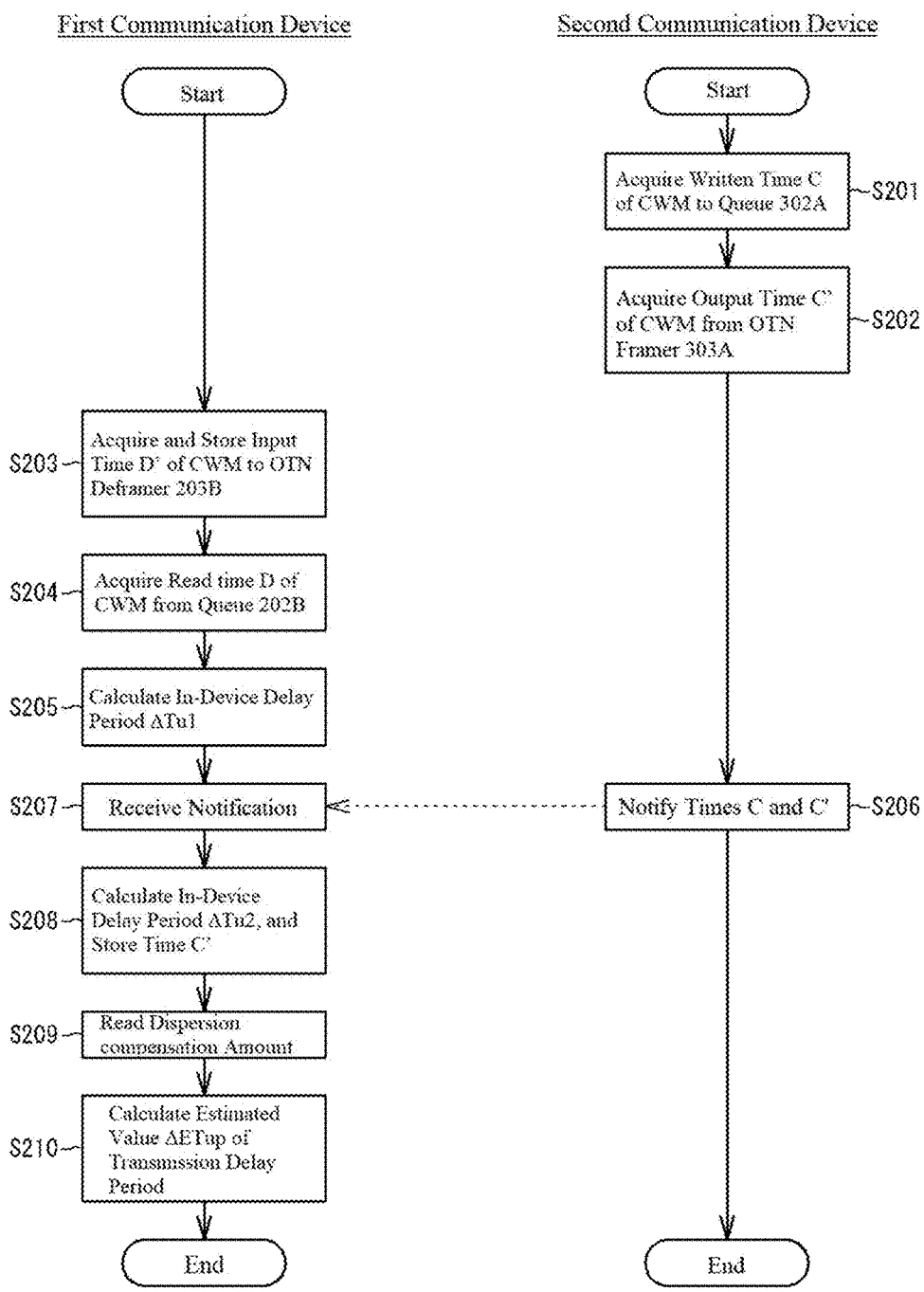
FIG. 11 is a flowchart showing an example of a procedure of delay period estimation processing in an uplink channel by the relay system according to the first embodiment.

FIG. 11 is a flowchart showing an example of a procedure of delay period estimation processing in an uplink channel by relay system 100 according to the first embodiment.

Processor 311 of second communication device 300 acquires a written time C of block 400 including the CWM to queue 302A (step S201). Further, processor 311 acquires an output time C' from OTN framer 303A of OTN frame 500 including the CWM (step S202).

Processor 211 of first communication device 200 acquires and stores an output time D' of OTN frame 500 including the CWM from OTN deframer 203B (step S203). Further, processor 211 acquires a read time D of block 400 including the CWM from queue 202B (step S204). Processor 211 calculates delay period $\Delta Tu1$ in first communication device 200 in the uplink channel by calculating the difference between time D and time D' (step S205).

Processor 311 inserts times C and C' into the OTN header and notifies first communication device 200 of times C and C' (step S206).

First communication device 200 receives the OTN frame including times C and C' in the OTN header (step S207).

Processor 211 calculates a difference between times C' and time C to calculate delay period $\Delta Tu2$ in second communication device 300 in the uplink channel, and stores time C' (step S208).

Processor 211 of first communication device 200 reads the dispersion compensation amount from the register of coherent optical transceiver 205 (step S209). Processor 211 calculates estimated value $\Delta ETup$ of the transmission delay period in the uplink channel based on the read dispersion compensation amount (step S210). Thus, the delay period estimation processing in the uplink channel is completed.

Figure 12:
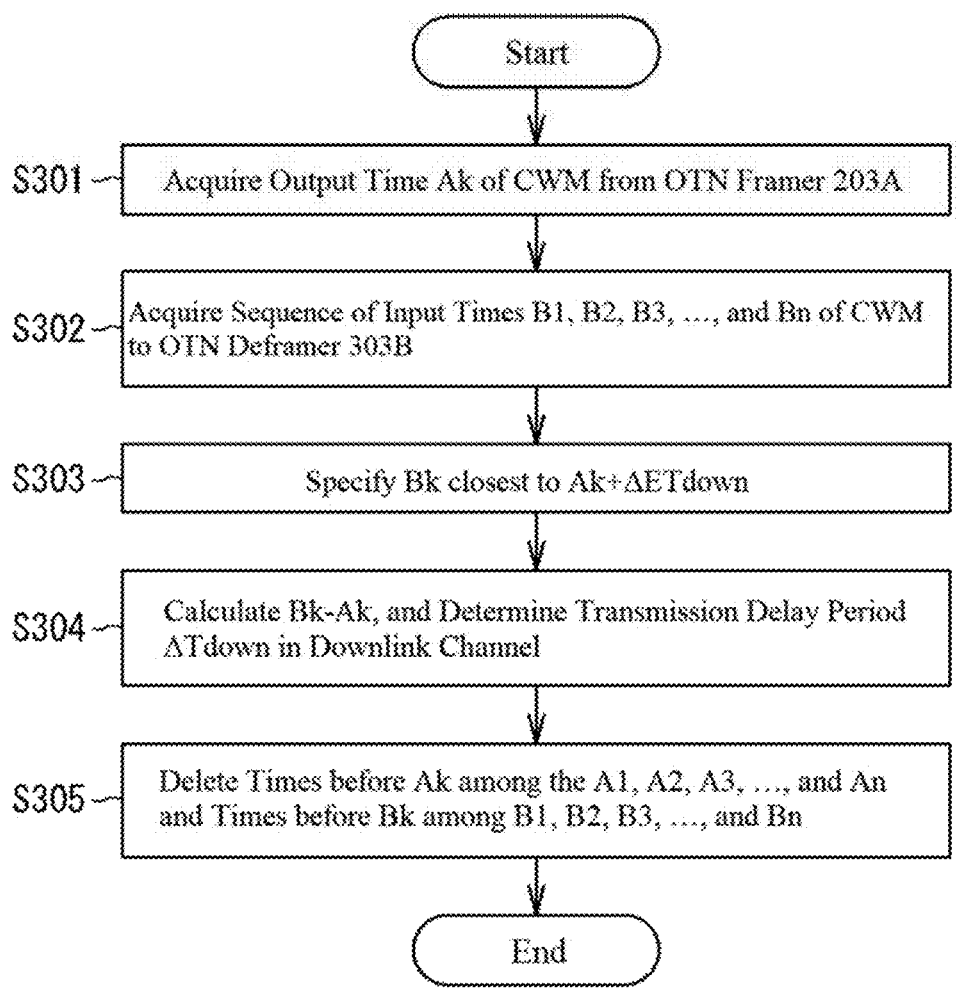
FIG. 12 is a flowchart showing an example of a procedure of delay period determination processing in a downlink channel by the relay system according to the first embodiment.

FIG. 12 is a flowchart showing an example of a procedure of delay period determination processing in a downlink channel by relay system 100 according to the first embodiment.

Processor 211 of first communication device 200 acquires first time Ak which is the output time of the OTN frame including the CWM from OTN framer 203A and is a sequence of the stored time A' (step S301). For example, processor 211 acquires times A1, A2, A3, ..., and An as a sequence of first transmission time A', and selects one time Ak therefrom as the first time.

Processor 211 of first communication device 200 acquires times B1, B2, B3, ..., and Bn which are reception times at which the OTN frame including the CWM is input to OTN deframer 303B and are a sequence of the stored times B' (step S302).

Processor 211 calculates time $Ak+\Delta ETdown$ by adding estimated value $\Delta ETdown$ of the transmission delay period in the downlink channel to time Ak. Processor 211 specifies second time Bk closest to time $Ak+\Delta ETdown$ among times B1, B2, B3, ..., and Bn (step S303).

Processor 211 calculates difference Bk-Ak between second time Bk and first time Ak, and determines the calculation result as transmission delay period $\Delta Tdown$ in the downlink channel (step S304). Further, processor 211 deletes the times before Ak among the stored times A1, A2, A3, ..., and An and the times before Bk among the stored times B1, B2, B3, ..., and Bn (step S305). Thus, the delay period determination processing in the downlink channel is completed.

In the delay period determination processing in the downlink channel described above, time Ak is acquired and time Bk closest to $Ak+\Delta ETdown$ is specified, but it is not limited thereto. First communication device 200 may acquire time Bk and specify time Ak closest to $Bk-\Delta ETdown$.

Figure 13:
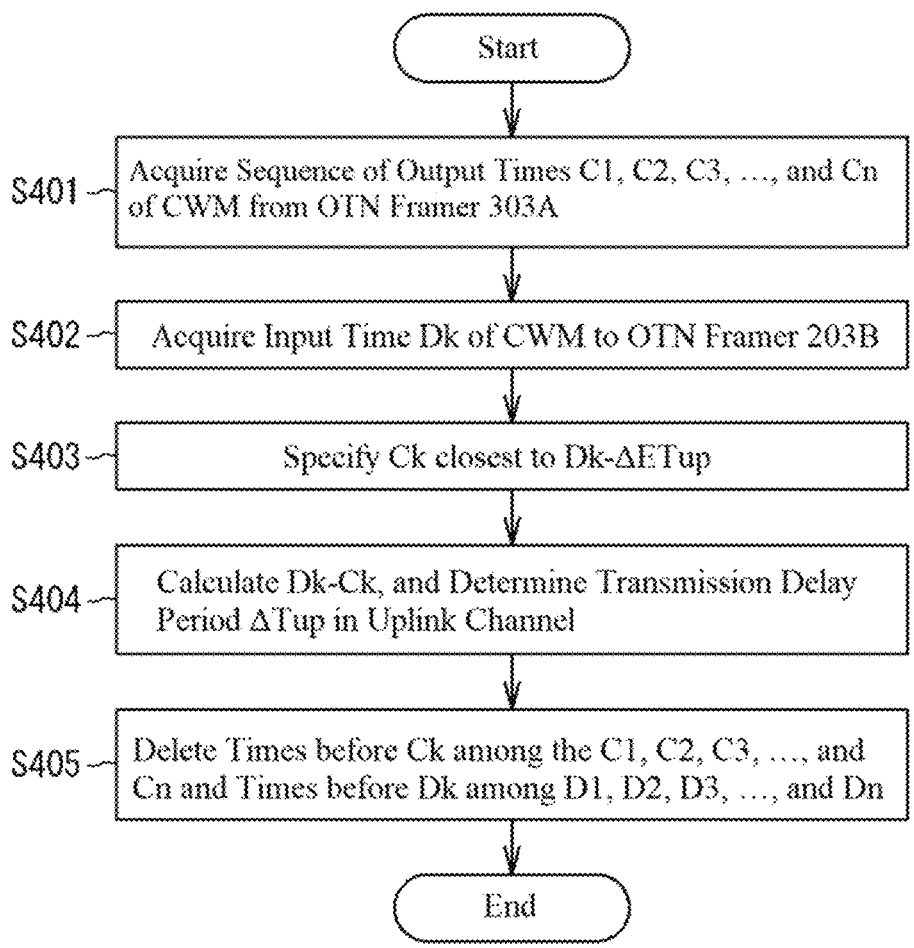
FIG. 13 is a flowchart showing an example of a procedure of delay period determination processing in an uplink channel by the relay system according to the first embodiment.

FIG. 13 is a flowchart showing an example of a procedure of delay period determination processing in the uplink channel by relay system 100 according to the first embodiment.

Processor 211 of first communication device 200 acquires times C1, C2, C3, ..., and Cn which are transmission times at which the OTN frame including the CWM is output from OTN framer 303A and which are a sequence of the stored times C' (step S401).

Processor 211 of first communication device 200 acquires a fourth time Dn which is the time at which the OTN frame including the CWM is input to OTN deframer 203B and which is a sequence of the stored times D'. For example, processor 211 acquires times D1, D2, D3, ..., and Dn as a sequence of fourth reception time D', and selects one time Dk therefrom as the fourth time (step S402).

Processor 211 calculates time $Dk-\Delta ETup$ by subtracting estimated value $\Delta ETup$ of the transmission delay period in the uplink channel from time Dk. Processor 211 specifies third time Ck closest to time $Dk-\Delta ETup$ among times C1, C2, C3, ..., and Cn (step S403).

Processor 211 calculates difference Dk−Ck between fourth time Dk and third time Ck, and determines the calculation result as transmission delay period ΔTup in the uplink channel (step S404). Further, processor 211 deletes the times before Ck among the stored times C1, C2, C3, ..., and Cn and the times before Dk among the stored times D1, D2, D3, ..., and Dn (step S405). Thus, the delay period determination processing in the uplink channel is completed.

In the delay period determination processing in the uplink channel described above, time Dk is acquired and time Ck closest to Dk−ΔETup is specified, but it is not limited thereto. First communication device 200 may acquire time Ck and specify time Dk that is closest to Ck+ΔETup.

Figure 14:
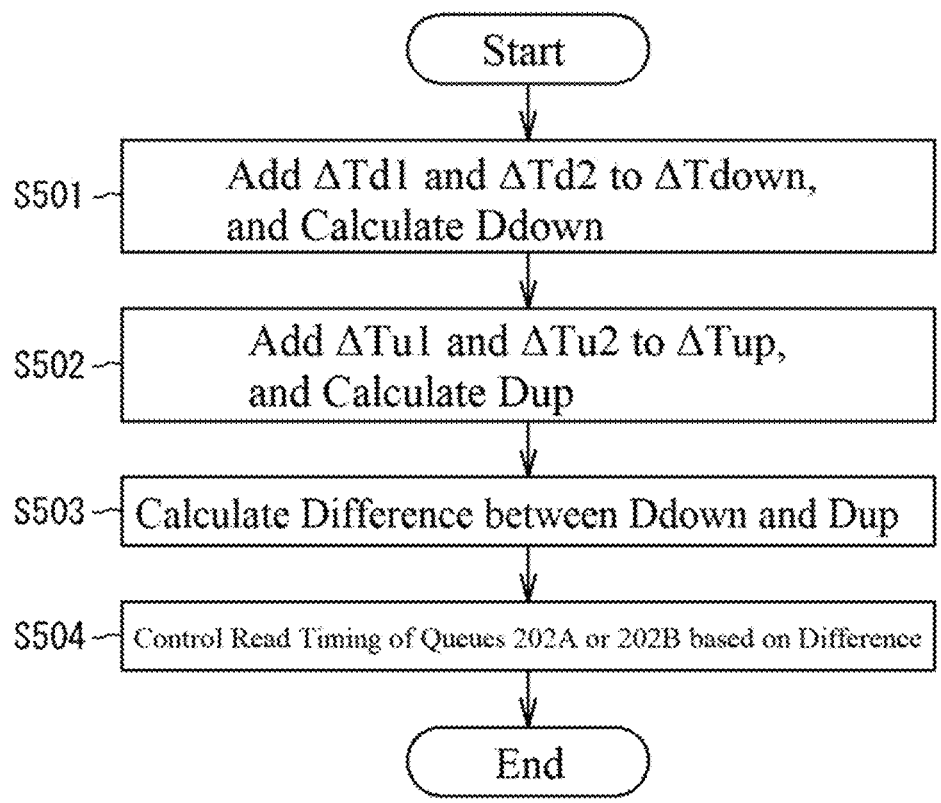
FIG. 14 is a flowchart showing an example of a procedure of delay period adjustment processing by the relay system according to the first embodiment.

FIG. 14 is a flowchart showing an example of a procedure of delay period adjustment processing by relay system 100 according to the first embodiment.

Processor 211 of first communication device 200 adds in-device delay periods ΔTd1 and ΔTd2 to the transmission delay period ΔTdown in the downlink channel to calculate relay delay period Ddown in the downlink channel (step S501).

Processor 211 adds in-device delay periods ΔTu1 and ΔTu2 to the transmission delay period ΔTup in the uplink channel to calculate relay delay period Dup in the uplink channel (step S502).

Processor 211 calculates the difference between relay delay period Ddown in the downlink channel and relay delay period Dup in the uplink channel (step S503).

Processor 211 controls the read timing of queues 202A or 202B of first communication device 200 based on the calculated difference (step S504), and symmetrizes the delay period in the uplink channel and the delay period in the downlink channel. Thus, the delay period adjustment processing is completed.

2. Second Embodiment

Figure 15:
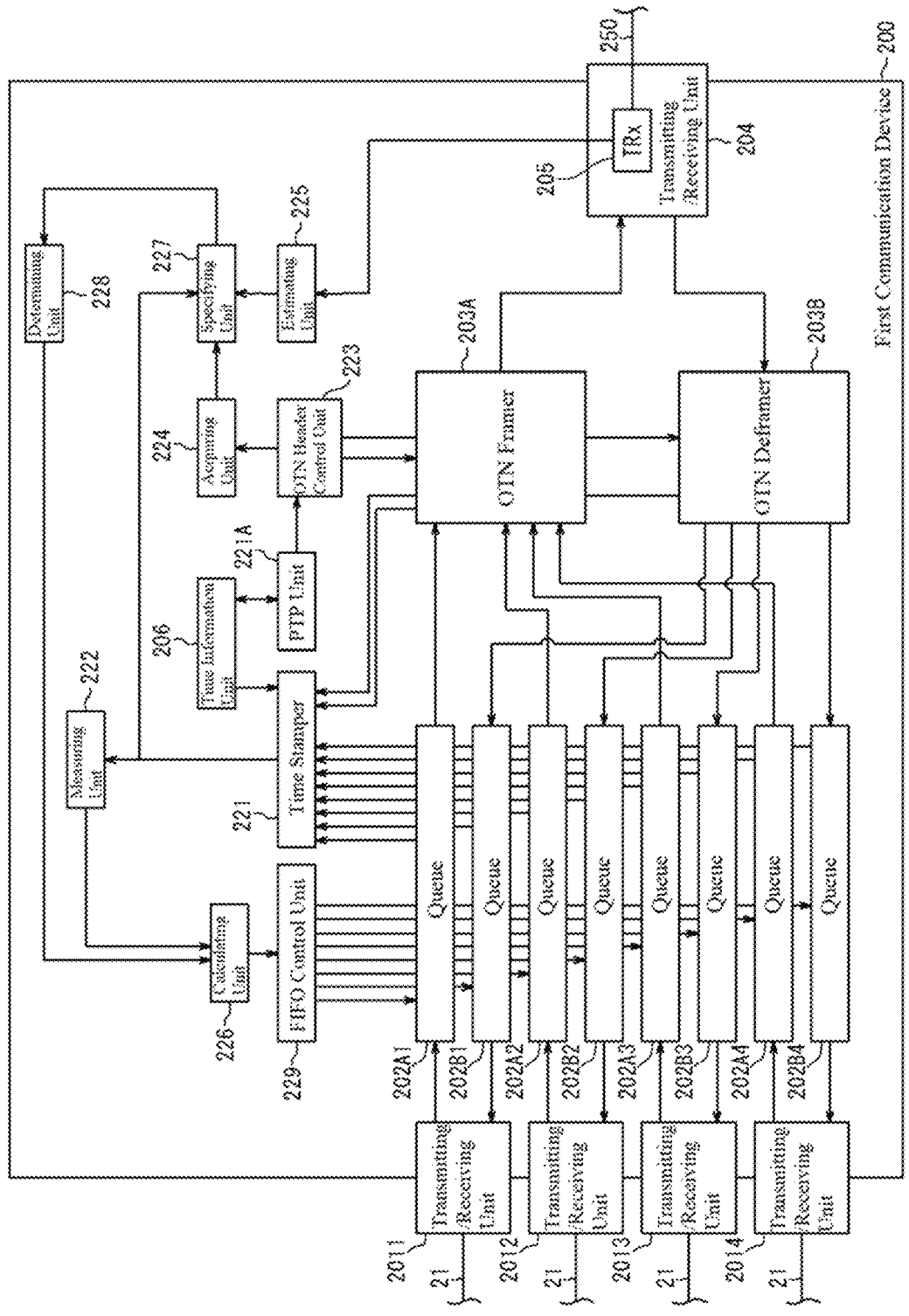
FIG. 15 is a functional block diagram showing an example of a function of the first communication device according to the second embodiment.
Figure 16:
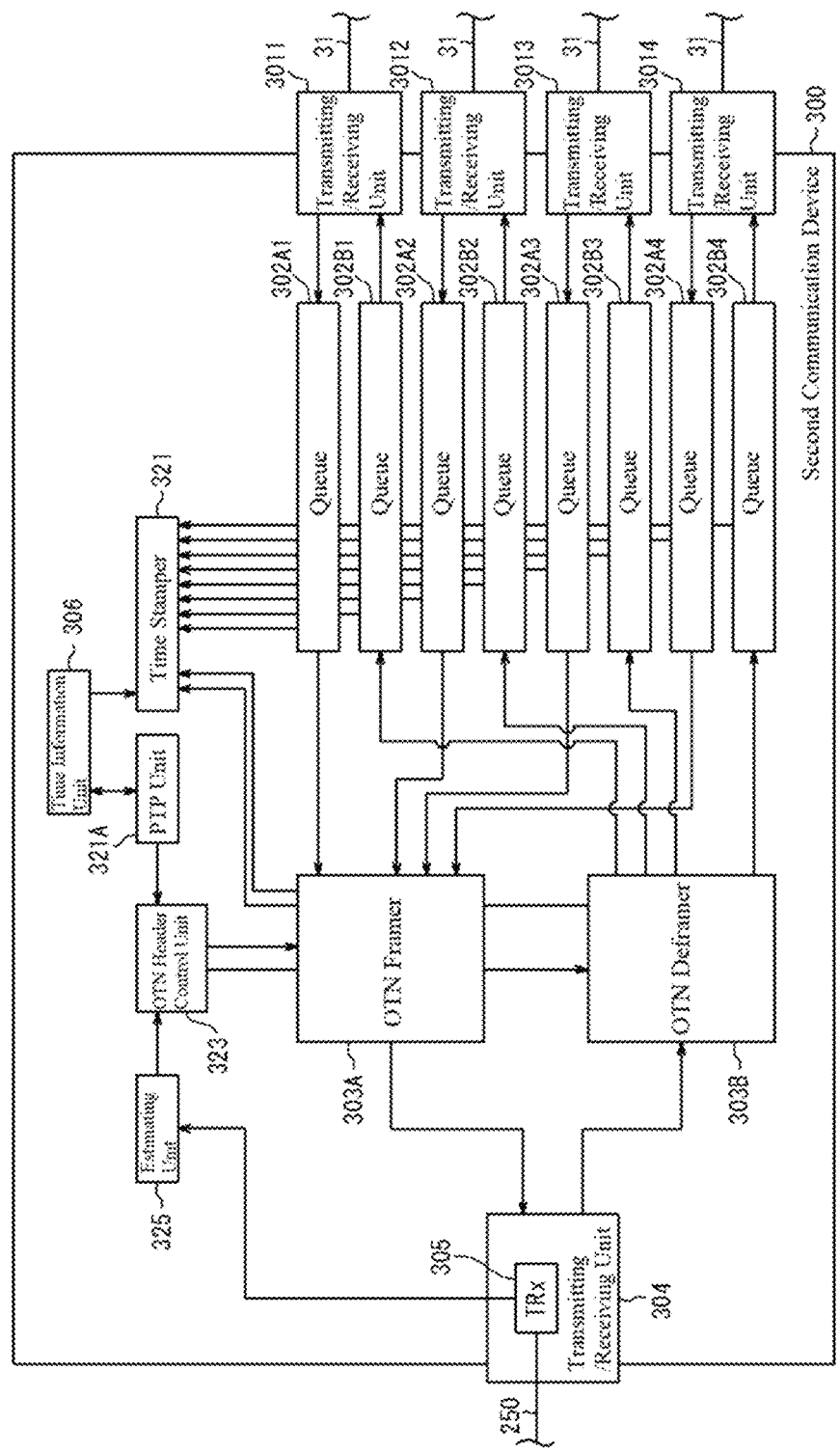
FIG. 16 is a functional block diagram showing an example of functions of the second communication device according to the second embodiment.

FIG. 15 is a functional block diagram showing an example of a function of the first communication device according to the second embodiment, and FIG. 16 is a functional block diagram showing an example of a function of the second communication device according to the second embodiment.

First communication device 200 and second communication device 300 are OTN concentrators according to the embodiment of the present disclosure. Each of first communication device 200 and second communication device 300 includes four client ports and one relay port, wavelength-multiplexes the four eCPRI signals of 25.8 Gbps, and transmits the wavelength-multiplexed signals as OTN signals of 100 Gbps. Each of first communication device 200 and second communication device 300 receives the OTN signal of 100 Gbps, restores four eCPRI signals of 25.8 Gbps, and transmits the restored signals.

As shown in FIG. 15, first communication device 200 includes four transmitting/receiving units 2011, 2012, 2013, and 2014. First communication device 200 includes four receive queues 202A1, 202A2, 202A3, and 202A4. Each of queues 202A1, 202A2, 202A3, and 202A4 is connected to OTN framer 203A. Each of four transmitting/receiving units 2011, 2012, 2013, and 2014 is a client port (first communication port). OTN framer 203A converts four client signals (eCPRI signals) received from BBU 20 into one OTN signal.

First communication device 200 includes four transmission queues 202B1, 202B2, 202B3, and 202B4. Each of queues 202B1, 202B2, 202B3, and 202B4 is connected to OTN deframer 203B. OTN deframer 203B converts the OTN signal received from second communication device 300 into four client signals (eCPRI signals).

As shown in FIG. 16, second communication device 300 includes four transmitting/receiving units 3011, 3012, 3013, and 3014, four receiving queues 302A1, 302A2, 302A3, and 302A4, and four transmitting queues 302B1, 302B2, 302B3, and 302B4. Each of four transmitting/receiving units 3011, 3012, 3013, and 3014 is a client port (second communication port).

In a relay system according to the embodiment of the present disclosure, a delay period in a downlink channel and a delay period in an uplink channel are determined for each client channel. For example, in first communication device 200, the port number of transmitting/receiving unit 2011 is #1, the port number of transmitting/receiving unit 2012 is #2, the port number of transmitting/receiving unit 2013 is #3, and the port number of transmitting/receiving unit 2014 is #4. In second communication device 300, the port number of transmitting/receiving unit 3011 is #1, the port number of transmitting/receiving unit 3012 is #2, the port number of transmitting/receiving unit 3013 is #3, and the port number of transmitting/receiving unit 3014 is #4. It is assumed that the client port #1 of first communication device 200 is connected to the client port #1 of second communication device 300, the client port #2 of first communication device 200 is connected to the client port #2 of second communication device 300, the client port #3 of first communication device 200 is connected to the client port #3 of second communication device 300, and the client port #4 of first communication device 200 is connected to the client port #4 of second communication device 300.

Measuring unit 222 measures delay period ΔTd1 in first communication device 200 in the downlink channel for each client port. Acquiring unit 224 acquires delay period ΔTd2 in second communication device 300 in the downlink channel for each client port. Estimating unit 325 is calculates estimated value ΔETdown of a transmission delay period of optical fiber cable 250 in the downlink channel based on coherent optical transceiver 305. Measuring unit 222 measures delay period ΔTu1 in first communication device 200 in the uplink channel for each client port. Acquiring unit 224 acquires delay period ΔTu2 in second communication device 300 in the uplink channel for each client port. Estimating unit 225 calculates estimated value ΔETup of the transmission delay period of optical fiber cable 250 in the uplink channel based on coherent optical transceiver 205. Each of estimated values ΔETdown and ΔETup of the transmission delay period is not a value specific to a particular client port but a value common to all client ports.

Time stamper 221 acquires transmission times A1, A2, A3, ..., and An and reception times D1, D2, D3, ..., and Dn for each client port. Time stamper 321 and reception times B1, B2, B3, ..., and Bn and transmission times C1, C2, C3, ..., and Cn for each client pt. Specifying unit 227 specifies the Bk closest to Ak+ΔETdown for each client port. Determining unit 228 calculates difference Bk-Ak for each client port and determines transmission delay period ΔTdown in the downlink channel. Specifying unit 227 specifies Ck that is closest to Dk−ΔETup for each client port. Determining unit 228 calculates difference Dk−Ck for each client port and determines the transmission delay period ΔTup in the uplink channel.

For example, processor 211 selects a combination of the client port #1 of first communication device 200 and the client port #1 of second communication device 300. Processors 211 and 311 execute, for the client port #1, the delay period estimation processing in the downlink channel, the delay period estimation processing in the uplink channel, the delay period determination processing in the downlink channel, the delay period determination processing in the uplink channel, and the delay period adjustment processing in FIGS. 10 to 14. Accordingly, delay period $\Delta Td1$ in first communication device 200 in the downlink channel between the client port #1 of first communication device 200 and the client port #1 of second communication device 300 is measured, delay period $\Delta Td2$ in second communication device 300 is acquired, transmission delay period $\Delta Tdown$ in the downlink channel is determined, and relay delay period Ddown in the downlink channel is calculated. Further, delay period $\Delta Tu1$ in first communication device 200 in the uplink channel between the client port #1 of first communication device 200 and the client port #1 of second communication device 300 is measured, delay period $\Delta Tu2$ in second communication device 300 is acquired, transmission delay period $\Delta Tup$ in the uplink channel is determined, and relay delay period Dup in the uplink channel is calculated. The read timings of queues 202A1 and 202B1 are controlled based on delay periods Ddown and Dup of the uplink and downlink channels between the client port #1 of first communication device 200 and the client port #1 of second communication device 300.

Processors 211 and 311 performs the same operation as described above in each of a combination of the client port #2 of first communication device 200 and the client port #2 of second communication device 300, a combination of the client port #3 of first communication device 200 and the client port #3 of second communication device 300, and a combination of the client port #4 of first communication device 200 and the client port #4 of second communication device 300.

The dispersion compensation amount acquired by coherent optical transceivers 205 and 305 does not depend on a specific port. Therefore, estimated value $\Delta ETup$ of the transmission delay period in the uplink channel may be calculated based on the dispersion compensation amount measured by coherent optical transceiver 205 every time the delay period estimation processing is executed for each client port, or may be calculated based on the dispersion compensation amount obtained in the delay period estimation processing for one specific client port and used to specify time Ck in not only the client port but also other client ports. As for estimated value $\Delta ETdown$ of the transmission delay period in the downlink channel, second communication device 300 may initially notify first communication device 200 of the dispersion compensation amount or estimated value $\Delta ETup$, or may continuously notify first communication device 200 of the dispersion compensation amount or estimated value $\Delta ETup$. First communication device 200 may use one $\Delta ETup$ to specify time Bk in a plurality of client ports or may use the latest $\Delta ETup$ to specify time Bk in each client port.

3. Third Embodiment

The amount of dispersion in optical fiber cable 250 changes according to the temperature of optical fiber cable 250 and the temperature of the optical transceiver of the opposing device. That is, when the temperature of optical fiber cable 250 or the optical transceiver of the opposing device changes, the transmission delay period changes. First communication device 200 according to the embodiment of the present disclosure performs a determination processing of determining whether or not to determine transmission delay periods $\Delta DTdown$ and $\Delta DTup$ in the uplink and the downlink channels of relay system 100 based on a change in the dispersion compensation amount. In the embodiment, when a dispersion compensation amount CCD is changed more than a previous value PCD by a predetermined threshold value Th, transmission delay periods $\Delta Tdown$ and $\Delta Tup$ in the uplink and the downlink channels are updated.

In the delay period estimation processing in the uplink channel, processor 211 stores the dispersion compensation amount read from the register of coherent optical transceiver 205 in, for example, nonvolatile memory 212. Processor 211 repeatedly executes the following determination processing regularly or irregularly.

Figure 17:
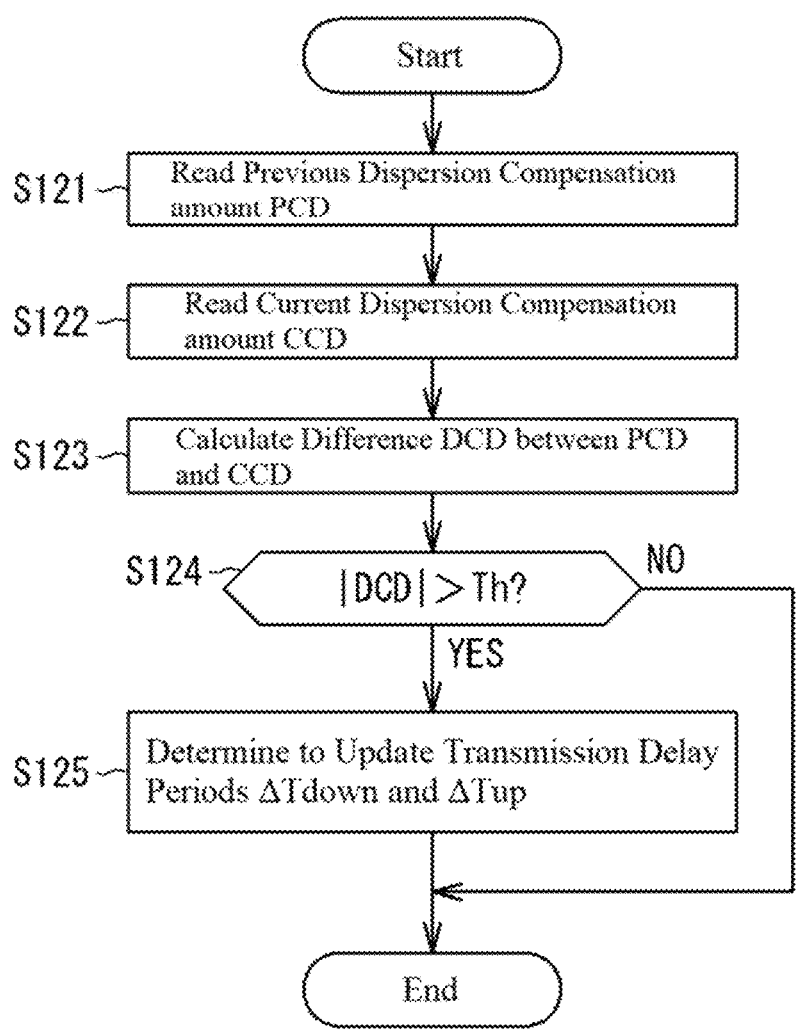
FIG. 17 is a flowchart showing an example of a procedure of determination processing by the relay system according to the third embodiment.

FIG. 17 is a flowchart showing an example of a procedure of determination processing by relay system 100 according to the third embodiment.

Processor 211 reads the previously acquired dispersion compensation amount PCD from nonvolatile memory 212 (step S121). Processor 211 reads the current dispersion compensation amount CCD from the register of coherent optical transceiver 205 (step S122).

Processor 211 calculates difference DCD between previous value PCD of the dispersion compensation amount and the current value CCD of the dispersion compensation amount (step S123). Processor 211 compares the absolute value of difference DCD with a predetermined threshold Th to determine whether the absolute value of difference DCD is larger than Th (step S124).

When the absolute value of DCD is larger than Th (YES in step S124), processor 211 determines to update transmission delay periods $\Delta Tdown$ and $\Delta Tup$ (step S125). In this case, the delay period estimation processing in the downlink channel, the delay period estimation processing in the uplink channel, the delay period determination processing in the downlink channel, and the delay period determination processing in the uplink channel of FIGS. 10 to 13 are executed. However, although the delay period adjustment processing shown in FIG. 14 can be executed at an initial stage of communication, there is a possibility that interruption or loss of a block occurs at an intermediate stage of communication to cause a communication abnormality. In the embodiment of the present disclosure, each of first communication device 200 and second communication device 300 decrypts the FEC, restore the eCPRI packet, temporarily stores the packet in the FIFO buffer, and FEC-encodes the packet read from the FIFO buffer. First communication device 200 and second communication device 300 can adjust the delay period by adjusting the packet interval according to the difference between delay periods Ddown and Dup in the processes of FEC decoding, buffering, and FEC encoding.

When the absolute values of DCD are less than or equal to Th (NO in step S124), processor 211 does not determine to update transmission delay periods $\Delta Tdown$ and $\Delta Tup$. In this case, the delay period estimation processing in the downlink channel, the delay period estimation processing in the uplink channel, the delay period determination processing in the downlink channel, the delay period determination processing in the uplink channel, and the delay period adjustment processing by adjusting the packet interval in FIGS. 10 to 14 are not executed. Thus, the determination processing is completed.

In the embodiment of the present disclosure, whether or not to update transmission delay periods $\Delta Tdown$ and $\Delta Tup$ in the uplink and the downlink channels is determined based on the change in the dispersion compensation amount acquired by coherent optical transceiver 205 of first communication device 200, but it is not limited thereto. First communication device 200 may determine whether to update transmission delay periods ΔTdown and ΔTup in the uplink and the downlink channels based on a change in the dispersion compensation amount or estimated value ΔETdown of the transmission delay period in the downlink channel notified from second communication device 300 to first communication device 200. Furthermore, first communication device 200 may determine whether or not to update transmission delay periods ΔTdown and ΔTup in the uplink and downlink channels based on both or one of a change in the dispersion compensation amount acquired by coherent optical transceiver 205 and a change in the dispersion compensation amount notified from the second communication device 200, or based on both or one of a change in estimated value ΔETdown of the transmission delay period in the downlink channel and a change in estimated value ΔETup of the transmission delay period in the uplink channel.

Transmission delay periods ΔTdown and ΔTup may be determined at all times without being based on the dispersion compensation amount. For example, first communication device 200 may store transmission delay period ΔTdown in the downlink channel determined in the previous delay period determination processing, set notified time B' as second time Bk every time time B' is newly notified, specify Ak closest to Bk−ΔTdown, calculate Bk−Ak, and update transmission delay period ΔTdown in the downlink channel. Similarly, first communication device 200 may store transmission delay period ΔTup in the uplink channel determined in the previous delay period determination processing, set the notified C' as third time Ck every time time C' is newly notified specify Dk closest to Ck+ΔTup, calculate Dk−Ck, and update transmission delay period ΔTup in the uplink channel.

As a modified example of the adjustment of the delay period, first communication device 200 may adjust the downstream transmission rate by synchronizing transmitting/receiving unit 204, OTN framer 203A, and the reading unit of queue 202A.

4. Other Embodiments

In the above-described embodiment, the CWM is used to measure the delay period in first communication device 200 and the second communication device, but it is not limited thereto. For example, when the client signal is a CPRI signal, the delay period in first communication device 200 and the second communication device may be measured using a K code such as K28.5.

In the above embodiment, second communication device 300 notifies first communication device 200 of second reception time B' and second transmission time B, and first communication device 200 calculates delay period ΔTd2 in second communication device 300 in the downlink channel based on second reception time B' and second transmission time B, but it is not limited thereto. Second communication device 300 may calculate delay period ΔTd2 in second communication device 300 in the downlink channel based on second reception time B' and second transmission time B, and notify first communication device 200 of the calculated delay period ΔTd2. Similarly, second communication device 300 may calculate delay period ΔTu2 in second communication device 300 in the uplink channel based on third reception time C and third transmission time C', and notify first communication device 200 of the calculated delay period ΔTu2.

In the above-described embodiment, first communication device 200 acquires a transmission time Ak of the OTN frame from first communication device 200 and reception times B1, B2, B3, . . . , and Bn of the OTN frame to second communication device 300, and specifies Bk closest to Ak+ΔTdown from among reception times B1, B2, B3, . . . , and Bn, but it is not limited to this. For example, first communication device 200 acquires reception times P1, P2, P3, . . . , and Pn of the eCPRI signal including the CWM in transmitting/receiving unit 201. To be more specific, time stamper 221 acquires the time at which the block including the CWM is written from transmitting/receiving unit 201 to queue 202A as reception times P1, P2, P3, . . . , and Pn. Second communication device 300 acquires transmission times Q1, Q2, Q3, . . . , and Qn of the eCPRI signal including the CWM in transmitting/receiving unit 301. To be more specific, time stamper 321 acquires the times at which block 400 including the CWM is read from queue 302B as transmission times Q1, Q2, Q3, . . . , and Qn. Second communication device 300 notifies first communication device 200 of transmission times Q1, Q2, Q3, . . . , and Qn. First communication device 200 selects one time Pk from reception times P1, P2, P3, . . . , and Pn and calculates Pk+PDdown. Specifying unit 227 can specify a time Qk closest to Pk+PDdown among transmission times Q1, Q2, Q3, . . . , and Qn, and determining unit 228 can determine difference Qk-Pk between time Qk and time Pk as delay period Ddown in the downlink channel. Second communication device 300 acquires reception times R1, R2, R3, . . . , and Rn of the eCPRI signal including the CWM in transmitting/receiving unit 301. Second communication device 300 notifies first communication device 200 of reception times R1, R2, R3, . . . , and Rn. First communication device 200 acquires transmission times S1, S2, S3, . . . , and Sn of the eCPRI signal including the CWM in transmitting/receiving unit 201. First communication device 200 selects one time Sk from transmission times S1, S2, S3, . . . , and Sn and calculates Sk-PDup. Specifying unit 227 can specify a time Rk closest to Sk-PDup from among reception times R1, R2, R3, . . . , and Rn, and determining unit 228 can determine difference Sk-Rk between time Sk and time Rk as delay period Dup in the uplink channel.

In the above embodiment, estimating unit 325 of second communication device 300 estimates transmission delay period ΔTdown of the downlink channel based on the dispersion compensation amount acquired by coherent optical transceiver 305 and notifies first communication device 200 of the estimated transmission delay period ΔTdown of the downlink channel, but it is not limited thereto. Second communication device 300 may notify first communication device 200 of the dispersion compensation amount read from the register of coherent optical transceiver 305, and estimating unit 225 of first communication device 200 may estimate transmission delay period ΔTdown of the downlink channel based on the notified dispersion compensation amount.

5. Effects of Embodiment

Relay system 100 relays communication between BBU 20 (first device) and RRH 30 (second device). Relay system 100 includes first communication device 200, second communication device 300, and optical fiber cable 250 connecting first communication device 200 and second communication device 300. First communication device 200 receives an original signal from BBU 20. Second communication device 300 transmits an original signal to RRH 30. First communication device 200 and second communication device 300 transmit and receive an optical signal corresponding to the original signal through optical fiber cable 250. The original signal includes a plurality of control codes in time order. First communication device 200 and second communication device 300 are time-synchronized. Second communication device 300 includes coherent optical transceiver 305 (second optical transceiver) connected to optical fiber cable 250. First communication device 200 or second communication device 300 includes estimating unit 225 or 325. Estimating unit 225 or 325 acquires estimated value ΔETdown of a transmission delay period, which is a period during which the optical signal is transmitted through optical fiber cable 250, based on the dispersion compensation amount acquired by coherent optical transceiver 305. Second communication device 300 includes OTN header control unit 323 (notifying unit). OTN header control unit 323 notifies the reception time of the control code to first communication device 200. First communication device 200 includes specifying unit 227 and determining unit 228. Specifying unit 227 specifies first time Ak related to the transmission of the first control code by first communication device 200 or second time Bk related to the reception of the first control code by second communication device 300 based on estimated value ΔETdown of the transmission delay period acquired by estimating unit 225 or 325. Determining unit 228 determines transmission delay period ΔTdown in the downlink channel based on first time Ak and second time Bk. Accordingly, based on estimated value ΔETdown of the transmission delay period, it is possible to specify first time Ak related to the time at which first communication device 200 transmits one first control code among the plurality of control codes or second time Bk related to the time at which second communication device 300 receives the first control code. Therefore, transmission delay period ΔTdown in the downlink channel can be accurately determined.

First communication device 200 includes coherent optical transceiver 205 (first optical transceiver) connected to optical fiber cable 250, and estimating unit 225. Based on the dispersion compensation amount acquired by coherent optical transceiver 205, estimating unit 225 acquires estimated value ΔETup of a transmission delay period during which an optical signal is transmitted through optical fiber cable 250. Second communication device 300 includes OTN header control unit 323 (notifying unit). OTN header control unit 323 notifies first communication device 200 of the transmission time of the control code. First communication device 200 includes specifying unit 227 and determining unit 228. Specifying unit 227 determines third time Ck related to the transmission of the second control code by second communication device 300 or fourth time Dk related to the reception of the second control code by first communication device 200 based on estimated value ΔETup of the transmission delay period acquired by estimating unit 225. Determining unit 228 determines transmission delay period ΔTup in the uplink channel based on fourth time Dk and third time Ck. Accordingly, third time Ck at which second communication device 300 transmits one second control code among the plurality of control codes or fourth time Dk at which first communication device 200 receives the second control code can be determined based on estimated value ΔETup of the transmission delay period. Therefore, transmission delay period ΔTup in the uplink channel can be accurately determined.

Calculating unit 226 may calculate relay delay periods Ddown and Dup, which are signal transmission periods between first communication port 201 connected to BBU 20 in first communication device 200 and second communication port 301 connected to RRH 30 in second communication device 300, by adding delay periods ΔTd1 and ΔTu1 in first communication device 200, delay periods ΔTd2 and ΔTu1 in second communication device 300, and transmission delay periods ΔTdown and ΔTup estimated by estimating unit 225 or 325. Accordingly, it is possible to accurately calculate relay delay periods Ddown and Dup in relay system 100.

First communication device 200 may include queue 202A (reception queue), OTN framer 203A (framer), time stamper 221 (first time acquiring unit), and measuring unit 222. Queue 202A stores blocks into which the downlink original signal is divided. OTN framer 203A generates an OTN frame (transmission frame) to be transmitted to second communication device 300 from the block read from queue 202A. Time stamper 221 acquires first reception time A at which the block including the control code is written in queue 202A. Time stamper 221 acquires first transmission time A' at which the block including the control code read from queue 202A is output to OTN framer 203A. Measuring unit 222 measures delay period ΔTd1 in first communication device 200 by calculating the difference between first transmission time A' and first reception time A acquired by time stamper 221. Second communication device 300 may include OTN deframer 303B (deframer), queue 302B (transmission queue), and time stamper 321 (second time acquiring unit). OTN deframer 303B restores the block from the OTN frame received by coherent optical transceiver 305. Queue 302B stores the block restored by OTN deframer 303B. Time stamper 321 acquires second reception time B' at which the block including the control code restored from the OTN frame including the control code is output from OTN deframer 303B. Time stamper 321 acquires second transmission time B at which the block including the control code is read from queue 302B. First communication device 200 may include acquiring unit 224. Acquiring unit 224 acquires delay period ΔTd2 in second communication device 300 acquired by calculating a difference between second reception time B' and second transmission time B acquired by time stamper 321. Accordingly, it is possible to accurately measure delay period ΔTd1 in first communication device 200 and delay period ΔTd2 in second communication device 300 in the downlink channel.

Second communication device 300 may include queue 302A (reception queue), OTN framer 303A (framer), and time stamper 321 (second time acquiring unit). Queue 202A stores blocks into which the uplink original signal is divided. OTN framer 303A generates an OTN frame (second transmission frame) to be transmitted to first communication device 200 from the block read from queue 302A. Time stamper 321 acquires third reception time C at which the block including the control code is written in queue 302A. Time stamper 321 acquires third transmission time C' at which the block including the control code read from queue 302A is output to OTN framer 303A. First communication device 200 may include OTN deframer 203B (deframer), queue 202B (transmission queue), time stamper 221, measuring unit 222, and acquiring unit 224. OTN deframer 203B restores the block from the OTN frame received by coherent optical transceiver 205. Queue 202B stores the block restored by OTN deframer 203B. Time stamper 221 acquires fourth reception time D' at which the block including the control code restored from the OTN frame including the control code is output from OTN deframer 203B. Time stamper 221 acquires fourth transmission time D at which the block including the control code is read from queue 202B. Measuring unit 222 measures delay period ΔTu1 in first communication device 200 by calculating the difference between fourth reception time D' and fourth transmission time D acquired by time stamper 221. Acquiring unit 224 acquires delay period ΔTu2 in second communication device 300 obtained by calculating the difference between the third sending time C' and third reception time C acquired by time stamper 221. Accordingly, it is possible to accurately measure delay period ΔTu1 in first communication device 200 and delay period ΔTu2 in second communication device 300 in the uplink channel.

First communication device 200 may further include FIFO control unit 229 (control unit). FIFO control unit 229 may control the timing of reading the block from queue 202A or may control the timing to read the block from queue 202B based on relay delay periods Ddown and Dup calculated by calculating unit 226. Accordingly, it is possible to correct the asymmetry of the delay in the communication.

First communication device 200 may include a plurality of transmitting/receiving units 2011, 2012, 2013, and 2014 (first communication ports) connected to BBU 20. Second communication device 300 may include a plurality of transmitting/receiving units 3011, 3012, 3013, and 3014 (second communication ports) connected to RRH 30. Calculating unit 226 may calculate relay delay periods Ddown and Dup for each of combinations of one of transmitting/receiving unit 2011, 2012, 2013, and 2014 and one of transmitting/receiving unit 3011, 3012, 3013, and 3014. Accordingly, relay delay periods Ddown and Dup between transmitting/receiving unit 2011, 2012, 2013, and 2014 of first communication device 200 and transmitting/receiving unit 3011, 3012, 3013, and 3014 second communication device 300 may be individually measured.

First communication device 200 may determine whether or not to update transmission delay period ΔTdown in the downlink channel based on the dispersion compensation amount acquired by coherent optical transceiver 305. Accordingly, when it can be determined that the transmission delay period of optical fiber cable 250 has changed, transmission delay period ΔTdown in the downlink channel can be updated.

First communication device 200 may determine whether or not to update transmission delay period ΔTup in the uplink channel based on the dispersion compensation amount acquired by coherent optical transceiver 205. Accordingly, when it can be determined that the transmission delay period of optical fiber cable 250 has changed, transmission delay period ΔTup in the uplink channel can be updated.

The control code may be a code word marker. Accordingly, the delay period can be estimated using the eCPRI signal.

6. Supplementary Notes

6-1. Supplementary Note 1

A relay system configured to relay communication between a first device and a second device, the relay system comprising: a first communication device configured to receive an original signal from the first device; and a second communication device configured to transmit the original signal to the second device; and an optical fiber connecting the first communication device and the second communication device, wherein the first communication device and the second communication device are configured to transmit and receive an optical signal through the optical fiber, the optical signal including the original signal and information added to the original signal, the information being communicated between the first communication device and the second communication device, the original signal includes a plurality of control codes communicated in time order, the first communication device and the second communication device are time-synchronized, the second communication device includes a second optical transceiver connected to the optical fiber, the first communication device or the second communication device include an estimating unit configured to acquire, based on a dispersion compensation amount acquired by the second optical transceiver, an estimated value of a transmission delay period, the transmission delay period being a period during which the optical signal is transmitted through the optical fiber, the second communication device includes a notifying unit configured to notify the first communication device of a reception time of the control code, the first communication device includes a calculating unit configured to calculate, based on the estimated value of the transmission delay period acquired by the estimating unit, an estimated delay period in the relay system, a specifying unit configured to specify, based on the estimated delay period calculated by the calculating unit, a second time at which a first control code received by the first communication device from the first device at a first time is transmitted from the second communication device to the second device and a determining unit configured to determine, based on the first time and the second time specified by the specifying unit, a delay period in a downlink channel.

6-2. Supplementary Note 2

A relay system configured to relay communication between a first device and a second device, the relay system comprising: a second communication device configured to receive an original signal from the second device; a first communication device configured to transmit an original signal to the first device; an optical fiber connecting the first communication device and the second communication device, wherein the first communication device and the second communication device are configured to transmit and receive an optical signal through the optical fiber, the optical signal including the original signal and information added to the original signal, the information being communicated between the first communication device and the second communication device, the original signal includes a plurality of control codes communicated in time order, the first communication device and the second communication device are time-synchronized, the first communication device includes a first optical transceiver connected to the optical fiber, an estimating unit configured to acquire, based on a dispersion compensation amount acquired by the first optical transceiver, an estimated value of a transmission delay period, the transmission delay period being a period during which the optical signal is transmitted through the optical fiber, the second communication device includes a notifying unit configured to notify the first communication device of a transmission time of the control code, the first communication device includes a calculating unit configured to calculate, based on the estimated value of the transmission delay period acquired by the estimating unit, an estimated delay period in the relay system, a specifying unit configured to specify, based on the estimated delay period calculated by the calculating unit, a third time at which a second control code transmitted by the first communication device to the first device at a fourth time is received by the second communication device from the second device, and a determining unit configured to determine, based on the fourth time and the third time specified by the specifying unit, a delay period in an uplink channel.

7. Appendix

The embodiments disclosed herein are illustrative in all respects, and are not restrictive. The scope of the present invention is defined not by the above-described embodiments but by the claims, and includes all modifications within the scope and meaning equivalent to the claims.

REFERENCE SIGNS LIST 10 communication system
20 BBU (first device)
30 RRH (second device)
21, 31, 250 optical fiber cable
100 relay system
200 first communication device
201, 2011, 2012, 2013, 2014 transmitting/receiving unit (first communication port)
202A, 202A1, 202A2, 202 A3, 202A4 queue (reception queue)
202B, 202B1, 202B2, 202B3, 202B4 queue (transmission queue)
203A OTN framer (framer)
203B OTN deframer (deframer)
204 transmitting/receiving unit
205 coherent optical transceiver (first optical transceiver)
206 time information unit
210 control circuit
211 processor
212 nonvolatile memory
213 volatile memory
214 master program
221 time stamper (first time acquiring unit)
221A PTP unit
222 measuring unit
223 OTN header control unit
224 acquiring unit
225 estimating unit
226 calculating unit
227 specifying unit
228 determining unit
229 FIFO control unit (control unit)
300 second communication device
301, 3011, 3012, 3013, 3014 transmitting/receiving unit (second communication port)
302A, 302A1, 302A2, 302A3, 302A4 queue (reception queue)
302B, 302B1, 302B2, 302B3, 302B4 queue (transmission queue)
303A OTN framer (framer)
303B OTN deframer (deframer)
304 transmitting/receiving unit
305 coherent optical transceiver (second optical transceiver)
306 time information unit
310 control circuit
311 processor
312 nonvolatile memory
313 volatile memory
314 slave program
321 time stamper (second time acquiring unit)
321A PTP unit
323 OTN header control unit (notifying unit)
325 estimating unit
400 block
500 OTN frame (transmission frame)

The invention claimed is:

1. A relay system configured to relay communication between a first circuitry and a second circuitry, the relay system comprising:
a first communication circuitry configured to receive an original signal from the first circuitry;
a second communication circuitry configured to transmit the original signal to the second circuitry; and
an optical fiber connecting the first communication circuitry and the second communication circuitry, wherein
the first communication circuitry and the second communication circuitry are configured to transmit and receive an optical signal through the optical fiber, the optical signal including the original signal and information added to the original signal, the information being communicated between the first communication circuitry and the second communication circuitry,
the original signal includes a plurality of control codes communicated in time order,
the first communication circuitry and the second communication circuitry are time-synchronized,
the first communication circuitry includes a first optical transceiver connected to the optical fiber,
the second communication circuitry includes a second optical transceiver connected to the optical fiber, and
the first communication circuitry or the second communication circuitry includes
an estimating circuit configured to acquire, based on a dispersion compensation amount acquired by the first optical transceiver or the second optical transceiver, an estimated value of a transmission delay period, the transmission delay period being a period during which the optical signal is transmitted through the optical fiber,
a specifying circuit configured to specify, based on the estimated value of the transmission delay period acquired by the estimating circuit, a reception-related time when a transmission-related time is known, or the transmission-related time when the reception-related time is known, the transmission-related time being related to transmission of a control code by the first communication circuitry or the second communication circuitry, the reception-related time being related to reception of the control code by the second communication circuitry or the first communication circuitry, and
a determining circuit configured to determine, based on the transmission-related time and the reception-related time, the transmission delay period in a downlink channel from the first communication circuitry toward the second communication circuitry or an uplink channel from the second communication circuitry toward the first communication circuitry.

2. The relay system according to claim 1, wherein
the transmission-related time is a time related to transmission of the control code by the first communication circuitry,
the reception-related time is a time related to reception of the control code by the second communication circuitry, and
the determining circuit is configured to determine, based on the transmission-related time and the reception-related time, the transmission delay period in the downlink channel.

3. The relay system according to claim 1, wherein
the transmission-related time is a time related to transmission of the control code by the second communication circuitry,
the reception-related time is a time related to reception of the control code by the first communication circuitry, and
the determining circuit is configured to determine, based on the transmission-related time and the reception-related time, the transmission delay period in the uplink channel.

4. The relay system according to claim 1, wherein
the first communication circuitry includes a calculating circuit configured to calculate a relay delay period by adding a delay period in the first communication circuitry, a delay period in the second communication circuitry, and the transmission delay period determined by the determining circuit, the relay delay period being a signal transmission period between a communication port connected to the first circuitry in the first communication circuitry and a communication port connected to the second circuitry in the second communication circuitry.

5. The relay system according to claim 4, wherein
the first communication circuitry includes
  a reception queue configured to store a block, the block being obtained by dividing the original signal,
  a framer configured to generate, from the block read from the reception queue, a transmission frame to be transmitted to the second communication circuitry,
  a first time acquiring circuit configured to acquire
    a first reception time at which the block including the control code is written into the reception queue, and
    a first transmission time at which the block including the control code and read from the reception queue is output to the framer, and
  a measuring circuit configured to measure the delay period in the first communication circuitry by calculating a difference between the first transmission time and the first reception time acquired by the first time acquiring circuit,
the second communication circuitry includes
  a deframer configured to restore the block from the transmission frame received by the second optical transceiver,
  a transmission queue configured to store the block restored by the deframer, and
  a second time acquiring circuit configured to acquire
    a second reception time at which the block including the control code and restored from the transmission frame including the control code is output from the deframer, and
    a second transmission time at which the block including the control code is read from the transmission queue, and
the first communication circuitry includes an acquiring circuit configured to acquire the delay period in the second communication circuitry, the delay period being obtained by calculating a difference between the second reception time and the second transmission time acquired by the second time acquiring circuit.

6. The relay system according to claim 4, wherein
the second communication circuitry includes
  a reception queue configured to store a block, the block being obtained by dividing the original signal,
  a framer configured to generate, from the block read from the reception queue, a transmission frame to be transmitted to the first communication circuitry, and
  a first time acquiring circuit configured to acquire
    a first reception time at which the block including the control code is written into the reception queue, and
    a first transmission time at which the block including the control code and read from the reception queue is output to the framer, and
the first communication circuitry includes
  a deframer configured to restore the block from the transmission frame received by the first optical transceiver,
  a transmission queue configured to store the block restored by the deframer,
  a second time acquiring circuit configured to acquire
    a second reception time at which a block including the control code and restored from the transmission frame including the control code is output from the deframer, and
    a second transmission time at which the block including the control code is read from the transmission queue,
  a measuring circuit configured to measure the delay period in the first communication circuitry by calculating a difference between the second reception time and the second transmission time acquired by the second time acquiring circuit, and
  an acquiring circuit configured to acquire the delay period in the second communication circuitry, the delay period being obtained by calculating a difference between the first transmission time and the first reception time acquired by the first time acquiring circuit.

7. The relay system according to claim 5, wherein
the determining circuit is configured to determine the transmission delay period in the downlink channel and the transmission delay period in the uplink channel,
the calculating circuit is configured to calculate the relay delay period in the downlink channel by adding the delay period in the first communication circuitry, the delay period in the second communication circuitry, and the transmission delay period in the downlink channel, and calculate the relay delay period in the uplink channel by adding the delay period in the first communication circuitry, the delay period in the second communication circuitry, and the transmission delay period in the uplink channel, and
the first communication circuitry further includes a control circuit configured to control, based on the relay delay period calculated by the calculating circuit, a timing to read the block from the reception queue or the transmission queue.

8. The relay system according to claim 4, wherein
the first communication circuitry includes a plurality of first communication ports connected to the first circuitry,
the second communication circuitry includes a plurality of second communication ports connected to the second circuitry, and
the calculating circuit is configured to calculate the relay delay period for each of combinations of one of the plurality of first communication ports and one of the plurality of second communication ports.

9. The relay system according to claim 1, wherein
the first communication circuitry or the second communication circuitry is configured to determine, based on a change in the dispersion compensation amount acquired by the first optical transceiver or the second optical transceiver, whether or not to update the transmission delay period in the downlink channel.

10. The relay system according to claim 1, wherein
the first communication circuitry or the second communication circuitry is configured to determine, based on a change in the dispersion compensation amount acquired by the first optical transceiver or the second optical transceiver connected to the optical fiber, whether or not to update the delay period in the uplink channel.

11. The relay system according to claim 1, wherein
the control code is a code word marker.

12. The relay system according to claim 2, wherein
the first communication circuit includes a calculating circuit configured to calculate a relay delay period by adding a delay period in the first communication circuit, a delay period in the second communication circuit, and the transmission delay period determined by the determining circuit, the relay delay period being a signal transmission period between a communication port connected to the first circuit in the first communication circuit and a communication port connected to the second circuit in the second communication circuit.

13. The relay system according to claim 3, wherein
the first communication circuit includes a calculating circuit configured to calculate a relay delay period by adding a delay period in the first communication circuit, a delay period in the second communication circuit, and the transmission delay period determined by the determining circuit, the relay delay period being a signal transmission period between a communication port connected to the first circuit in the first communication circuit and a communication port connected to the second circuit in the second communication circuit.

14. The relay system according to claim 2, wherein
the control code is a code word marker.

15. The relay system according to claim 3, wherein
the control code is a code word marker.

16. The relay system according to claim 4, wherein
the control code is a code word marker.

17. The relay system according to claim 5, wherein
the control code is a code word marker.

18. The relay system according to claim 6, wherein
the control code is a code word marker.

19. A communication circuitry configured to
receive, from a first circuitry, an original signal including a plurality of control codes communicated in time order,
transmit, to an opposing circuitry connected through an optical fiber, an optical signal including the original signal and information added to the original signal, the information being directed to the opposing circuitry,
receive, from the opposing circuitry, an optical signal including the original signal and information added to the original signal, the information being from the opposing circuitry, and
transmit, to the first circuitry, the original signal based on the received optical signal,
the communication circuitry comprising:
a first optical transceiver connected to the optical fiber;
an estimating circuit configured to acquire, based on a dispersion compensation amount acquired by the first optical transceiver or a second optical transceiver included in the opposing circuitry and connected to the optical fiber, an estimated value of a transmission delay period, the transmission delay period being a period during which the optical signal is transmitted through the optical fiber;
a specifying circuit configured to specify, based on the estimated value of the transmission delay period acquired by the estimating circuit, a reception-related time when a transmission-related time is known, or the transmission-related time when the reception-related time is known, the transmission-related time being related to transmission of a control code by the communication circuitry or the opposing circuitry, the reception-related time being related to reception of the control code by the opposing circuitry or the communication circuitry; and
a determining circuit configured to determine, based on the transmission-related time and the reception-related time, the transmission delay period in a first transmission direction from the communication circuitry toward the opposing circuitry or a second transmission direction from the opposing circuitry toward the communication circuitry.

20. A delay period determination method for determining, by a communication circuitry, a delay period in a relay system in which the communication circuitry and an opposing circuitry are connected to each other through an optical fiber, the delay period determination method comprising:
acquiring, based on a dispersion compensation amount acquired by a first optical transceiver included in the communication circuitry and connected to the optical fiber or a second optical transceiver included in the opposing circuitry and connected to the optical fiber, an estimated value of a transmission delay period, the transmission delay period being a period during which an optical signal is transmitted through the optical fiber;
specifying, based on the estimated value of the transmission delay period acquired by an estimating circuit, a reception-related time when a transmission-related time is known, or the transmission-related time when the reception-related time is known, the transmission-related time being related to transmission of a control code by the communication circuitry or the opposing circuitry, the reception-related time being related to reception of the control code by the opposing circuitry or the communication circuitry; and
determining, based on the transmission-related time and the reception-related time, the transmission delay period in a first transmission direction from the communication circuitry toward the opposing circuitry or a second transmission direction from the opposing circuitry toward the communication circuitry.

* * * * *